US009571795B2

(12) United States Patent  
Fujikawa et al.

(10) Patent No.: US 9,571,795 B2  
(45) Date of Patent: Feb. 14, 2017

(54) IMAGE PROCESSING DEVICE AND IMAGE PROCESSING PROGRAM

(71) Applicant: OMRON Corporation, Kyoto-shi (JP)

(72) Inventors: Masahiro Fujikawa, Nara (JP); Koji Shimada, Ayabe (JP); Kakuto Shirane, Moriyama (JP); Katsuhiro Shimoda, Ootsu (JP); Yoshihiro Moritoki, Nagaoka (JP); Yasuyuki Ikeda, Kyoto (JP); Takeshi Yoshiura, Shanghai (CN)

(73) Assignee: OMRON Corporation, Kyoto-shi (JP)

( * ) Notice: Subject to any disclaimer, the term of this patent is extended or adjusted under 35 U.S.C. 154(b) by 607 days.

(21) Appl. No.: 13/975,435

(22) Filed: Aug. 26, 2013

(65) Prior Publication Data  
US 2014/0015957 A1 Jan. 16, 2014

Related U.S. Application Data

(63) Continuation of application No. PCT/JP2011/056776, filed on Mar. 22, 2011.

(30) Foreign Application Priority Data

Mar. 15, 2011 (JP) ................. 2011-056448

(51) Int. Cl.  
H04N 7/18 (2006.01)  
G06T 3/00 (2006.01)  
(Continued)

(52) U.S. Cl.  
CPC ............. H04N 7/18 (2013.01); G01B 11/27 (2013.01); G06T 3/00 (2013.01); G06T 7/0044 (2013.01);  
(Continued)

(58) Field of Classification Search  
CPC ........ H04N 7/18; H04N 5/225; H04N 5/2259; H04N 5/232; H04N 5/23216; H04N 5/23296; B07C 5/10; G06T 1/0014; G06T 1/0007  
(Continued)

(56) References Cited

U.S. PATENT DOCUMENTS 7,512,260 B2   3/2009  Murakami et al.  
7,839,431 B2  11/2010  Swarr et al.  
(Continued)

FOREIGN PATENT DOCUMENTS

CN    1903522 A    1/2007  
CN  101166239 A    4/2008  
(Continued)

Primary Examiner — Mohammed Rahaman  
Assistant Examiner — Jimmy S Lee  
(74) Attorney, Agent, or Firm — Mots Law, PLLC

(57) ABSTRACT

An image processing device includes: an image receiving part configured to receive an image of a target workpiece on a surface of a conveying path captured by means of the imaging unit; a position acquiring part configured to acquire a position of the target workpiece in the captured image; a tilt acquiring part configured to acquire, by using the position of the target workpiece in the captured image acquired by means of the position acquiring part, a tilt angle of an imaging plane of the imaging unit relative to the surface of conveying path; and an outputting part configured to output assistant information used for assisting in the adjustment of the posture of the imaging unit by using the acquired tilt angle.

10 Claims, 22 Drawing Sheets

(51) Int. Cl.
*G01B 11/27* (2006.01)
*G06T 7/00* (2006.01)
*H04N 5/232* (2006.01)

(52) U.S. Cl.
CPC ..... *H04N 5/232* (2013.01); *G06T 2207/30164* (2013.01); *G06T 2207/30208* (2013.01); *G06T 2207/30244* (2013.01); *H04N 5/23296* (2013.01)

(58) Field of Classification Search
USPC .......................................................... 348/95
See application file for complete search history.

(56) References Cited

U.S. PATENT DOCUMENTS

| | | | |
|---|---|---|---|
| 2004/0100563 A1* | 5/2004 | Sablak | H04N 5/77 348/211.4 |
| 2005/0207671 A1* | 9/2005 | Saito | G06K 9/3283 382/275 |
| 2006/0050267 A1 | 3/2006 | Murakami et al. | |
| 2007/0179671 A1 | 8/2007 | Arimatsu et al. | |
| 2008/0094480 A1 | 4/2008 | Swarr et al. | |
| 2008/0259289 A1* | 10/2008 | Nozaki | G03B 17/00 353/70 |
| 2008/0267531 A1 | 10/2008 | Satoh et al. | |
| 2011/0082586 A1* | 4/2011 | Nishihara | B25J 9/0093 700/259 |

FOREIGN PATENT DOCUMENTS

| | | | |
|---|---|---|---|
| EP | 1638050 A2 | 3/2006 | |
| EP | 1713275 A1 | 10/2006 | |
| JP | 2005-049590 A | 2/2005 | |
| JP | 2006-244363 A | 9/2006 | |
| JP | 2007-334423 A | 12/2007 | |
| JP | 2008-003394 A | 1/2008 | |
| JP | 2008-072674 A | 3/2008 | |
| JP | 2009-036589 A | 2/2009 | |
| JP | WO 2009148089 A1 * | 12/2009 | ............ B25J 9/0093 |

* cited by examiner

IMAGE PROCESSING DEVICE AND IMAGE PROCESSING PROGRAM

CROSS REFERENCE TO RELATED APPLICATIONS

This application is a Continuation of PCT Application No. PCT/JP2011/056776 filed on Mar. 22, 2011, and claims the priority of Japanese Patent Application No. 2011-0056448 filed on Mar. 15, 2011, entitled "IMAGE PROCESSING DEVICE AND IMAGE PROCESSING PROGRAM," the entire contents of both of which are incorporated herein by reference.

TECHNICAL FIELD

This disclosure relates to an image processing device and an image processing program, and particularly to an image processing device and an image processing program, which assist the adjustment of an installation of an imaging unit.

BACKGROUND ART

In the field of Factory Automation (FA) and the like, a visual sensor is used for optically detecting a defect generated in a semi-finished product in the middle of production or in a product before shipment, and/or for optically measuring the size of the defect.

When the detection or the measurement is performed with the visual sensor, it is necessary to properly capture an image of a workpiece. The workpiece is inspected and measured by performing various steps of image processing to an input image obtained by the imaging.

When the visual sensor is used on a production site, it is necessary to properly set an imaging unit, such as a camera, which is included in the visual sensor. The setting of an imaging unit includes, for example, the setting of a view angle of the imaging unit.

A visual field of the imaging unit is determined by an installation posture, such as an angle of the imaging unit. At the production site, when the position of the imaging unit is shifted from the installed position to shift the visual field from a predetermined range, the workpiece no longer fits in the visual field, so it becomes difficult or impossible to perform the inspection and the measurement using the image. Accordingly, in order to return the imaging unit to its original posture, generally the operator checks the image on a monitor, and manually adjusts the installed posture by trial and error until the image of the workpiece is captured in a predetermined position of the visual field.

For example, Patent Document 1(Japanese Unexamined Patent Publication No. 2008-3394) proposes a camera posture adjustment method in order to support the adjustment of the installed posture of the imaging unit. According to the method disclosed in Patent Document 1, tilt information indicating the tilt of the imaging surface of the camera is displayed in order to facilitate the adjustment. In Patent Document 1, the camera is installed on a copy stand (a copy board) so as to be parallel to an original board.

SUMMARY OF THE INVENTION

The camera of Patent Document 1 has the installation position fixed on the copy board. Therefore, the tilt information expressing parallelism between the original board and the camera is sufficient for the information presented for the adjustment. On the other hand, when the device is assembled, it is difficult to uniquely determine the installation posture of the camera only by the tilt information.

An object of the invention is to provide an image processing device and an image processing program, which can easily adjust the posture of the imaging unit.

In accordance with one aspect of the invention, an image processing device is provided that receives a captured image obtained by an imaging process ("imaging") from an imaging unit. The imaging unit is disposed such that at least part of the conveying path for workpieces is included in the imaging visual field. The image processing device includes: an image reception part that receives the captured image, the captured image being acquired such that the imaging unit captures an image of a target workpiece placed on the conveying path; a position acquisition part that acquires a position of the target workpiece in the captured image; a tilt acquisition part that acquires a tilt angle of a surface including the imaging visual field of the imaging unit relative to a surface on which the target workpiece is placed using the acquired position; and an output part that outputs assist information for assisting in an adjustment of a posture of the imaging unit using the acquired tilt angle.

The assist information may include information indicating a direction in which the posture of the imaging unit should be changed.

The tilt acquisition part may acquire the tilt angle as a deviation amount between the acquired position of the target workpiece in the captured image and a predetermined position in the captured image.

The tilt acquisition part may acquire the tilt angle as a distance between the acquired position of the target workpiece in the captured image and a predetermined position in the captured image.

The target workpiece may have a predetermined shape, and the tilt acquisition part may acquire the tilt angle as a degree of deformation of a shape of the target workpiece in the captured image from the predetermined shape.

The assist information may include the captured image, and the output part may include a storage part that stores the assist information in a memory.

The tilt acquisition part may acquire the tilt angle as a deviation amount between the position of the target workpiece in the captured image included in the assist information stored in the storage part and the position of the target workpiece, which is acquired by the position acquisition part, in the captured image received by the image reception part.

The tilt acquisition part may acquire the tilt angle as a distance between the position of the target workpiece in the captured image included in the assist information stored in the storage part and the position of the target workpiece, acquired by the position acquisition part, in the captured image received by the image reception part.

The target workpiece may have a predetermined shape, and the tilt acquisition part may acquire the tilt angle as a degree of deformation of the shape of the target workpiece in the captured image received from the imaging unit by the image reception part from the shape of the target workpiece in the captured image included in the assist information stored in the storage part.

In accordance with another aspect of the invention, an image processing program is executed by a computer, with the computer receiving a captured image obtained by imaging from an imaging unit.

The image processing program causes the computer to act as: an image reception part that receives the captured image, the captured image being acquired such that the imaging unit captures an image of a target workpiece placed on the conveying path; a position acquisition part that acquires a position of the target workpiece in the received captured image; a tilt acquisition part that acquires a tilt angle of a surface including an imaging visual field of the imaging unit referenced to a surface on which the target workpiece is placed using the acquired position; and an output part that outputs assist information for assisting a posture adjustment of the imaging unit using the acquired tilt angle.

According to the above aspect(s), the operator can adjust the posture of the imaging unit using the assist information.

DETAILED DESCRIPTION

Figure 1:
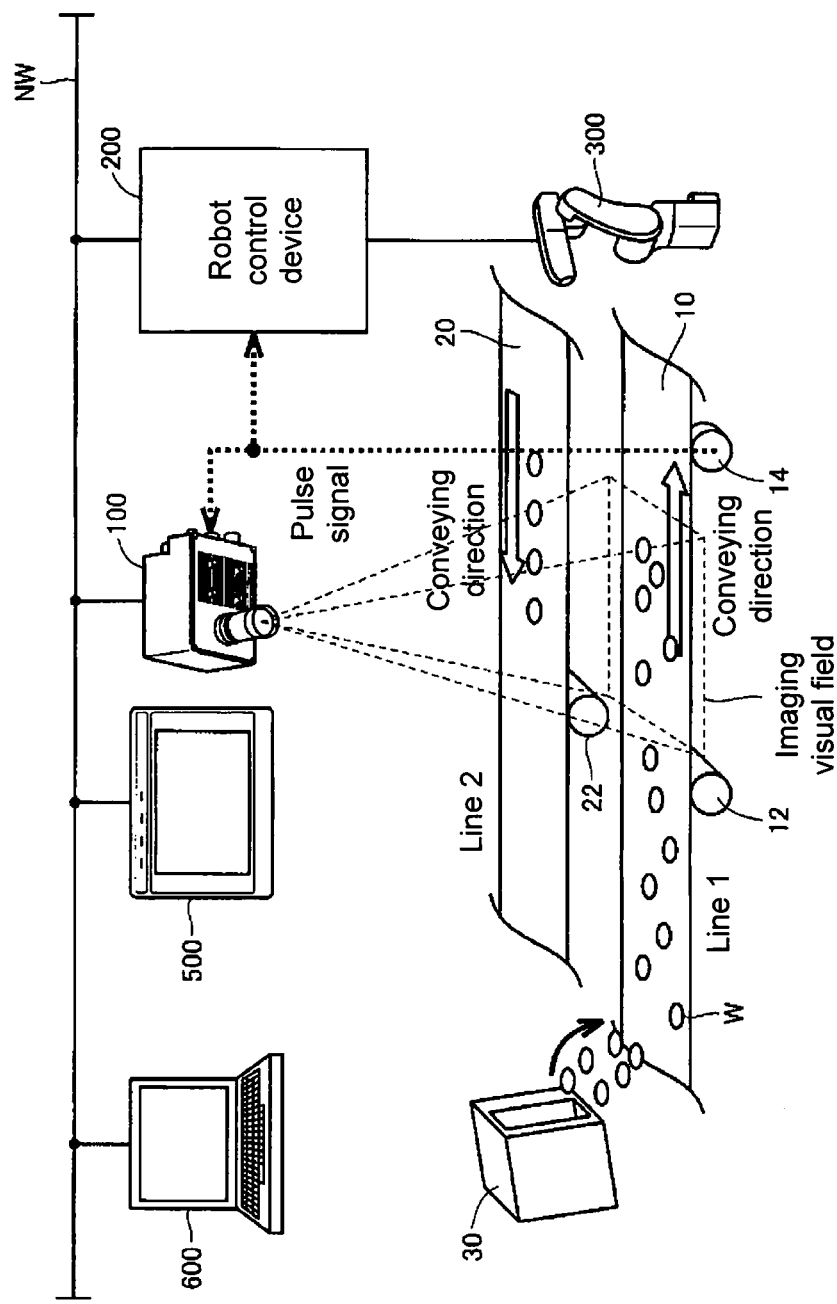
FIG. 1 is a schematic diagram illustrating a conveyer tracking system using a visual sensor according to a first embodiment.

Hereinafter, embodiments of the invention will be described with reference to the drawings. In the drawings, the identical or equivalent component is designated by the identical symbol, and any overlapping description is not repeated.

[First Embodiment]

FIG. 1 is a schematic diagram illustrating a conveyer tracking system using a visual sensor according to a first embodiment of the invention. The conveyer tracking system in FIG. 1 includes two conveyers 10 and 20. The conveyers 10 and 20 are rotated by driving rollers 12 and 22, respectively. Hereinafter, the conveyers 10 and 20 are also referred to as a line 1 and a line 2. In the example in FIG. 1, the line 1 moves to a right side, and the line 2 moves to a left side. A carrying-out device 30 or the like randomly supplies workpieces W to the line 1 from the left side. The workpieces W on the line 1 move from the left to the right. Typically, foods such as a sweet stuff or various tablets are considered as the workpieces W.

A visual sensor 100 of the first embodiment is provided in a predetermined position above the line 1. An imaging unit captures an image of subjects such as the workpieces. A captured image processing unit processes the image captured by the imaging unit. The imaging unit and the captured image processing unit are integrally formed in the visual sensor 100. Alternatively, the imaging unit and the captured image processing unit may be formed separately.

In the visual sensor 100, an imaging visual field is set to include the entire width of the line 1. The width direction of the line 1 is a direction orthogonal to the conveying direction. The imaging visual field can be determined by a view angle of the imaging unit to be set. The imaging unit is a camera, for example. In the description, the imaging visual field corresponds to a range where the image can be captured with the imaging unit, and sometimes the imaging visual field is called an "imaging range".

As illustrated in FIG. 1, when monitoring or measuring the workpieces on the conveying path using an image acquired by capturing the workpieces, it is necessary that the captured image be not deformed. That is, it is desirable that a surface including the imaging visual field is parallel to the conveying path surface. In the first embodiment, a tilt angle is used as an index related to parallelism between the surfaces. The tilt angle is described in detail later.

The visual sensor 100 is set such that the surface including the imaging visual field (imaging range) is parallel to the conveying path surface. Therefore, the visual sensor 100 continuously captures the image in a predetermined period to be able to sequentially capture the image of the workpieces W flowing on the line 1. The visual sensor 100 performs measurement processing such as pattern matching to the sequentially-captured image, thereby performing positioning processing and/or tracking processing for each workpiece. Thus, the imaging unit (an imaging unit 110 in FIG. 2) of the visual sensor 100 is disposed to capture the image of the workpiece W conveyed on the conveyer 10. A captured image processing unit 120 (see FIG. 2) that processes the captured image is connected to the imaging unit 110.

A robot 300 is disposed on the downstream of the visual sensor 100 in the conveying direction of the line 1. The robot 300 holds the workpiece W and moves the workpiece W from the line 1 to the line 2 by its arm. That is, the robot 300 is disposed on the downstream of the imaging range of the imaging unit of the visual sensor 100 in the conveying route of the conveyer 10 (the line 1). Also, the robot 300 corresponds to the moving machine, or any other industrial robot(s), which handles the workpieces W. More specifically, the robot 300 positions the arm onto a target workpiece W, picks up the workpiece W, and aligns the workpieces W on the line 2.

The robot 300 is disposed on a moving mechanism (not illustrated) that moves the robot 300 along the line 1, and the robot 300 moves across a predetermined range. The moving range of the robot 300 is also called a tracking range.

The tracking processing and the positioning processing of the robot 300 are controlled using a detection result of an encoder 14 provided in the line 1. Typically, a rotary encoder is used as the encoder 14, and a pulse signal is generated in association with the rotation. The number of rotations of a roller coupled to the conveyer 10 (the line 1), namely, the pulse signals generated by the encoder 14, corresponds to a signal indicating a travel distance in the conveying route of the conveyer 10 by counting the number of pulses of the generated pulse signal. The travel distance of the conveyer 10 is calculated based on the pulse signal.

The robot 300 performs an action in response to an instruction from a robot control device 200. That is, the robot control device 200 is the control device that controls robot 300, that is, of the moving machine. The robot control device 200 is connected to the visual sensor 100 through a network NW, and provides an instruction necessary for the action to hold the workpiece W to the robot 300 based on the position of each workpiece W detected by the visual sensor 100.

An operation display device 500, and a support device 600 that has a function equivalent to a personal computer, are connected to the network NW and to the visual sensor 100 and the robot control device 200. The operation display device 500 displays a processing result from the visual sensor 100 and an action state of the robot 300 from the robot control device 200, and provides various instruction to the visual sensor 100 and/or the robot control device 200 in response to a user's operation.

In the conveyer tracking system in FIG. 1, there is a potential need to further enhance a line speed (a conveying speed) in order to improve productivity. In order to meet the need, in the configuration of the conveyer tracking system of the first embodiment, the pulse signal generated by the encoder 14 is input to not only the robot control device 200 but also the visual sensor 100. The visual sensor 100 and the robot control device 200 acquire the positional information of the target on the conveyer while synchronizing with each other. This allows the action to be performed, while communication between the robot control device 200 and the visual sensor 100 is conducted with each other through network NW. At this point, detailed action control in which the robot control device 200 and the visual sensor 100 synchronize with each other is not given.

<Hardware Configuration>

Figure 2:
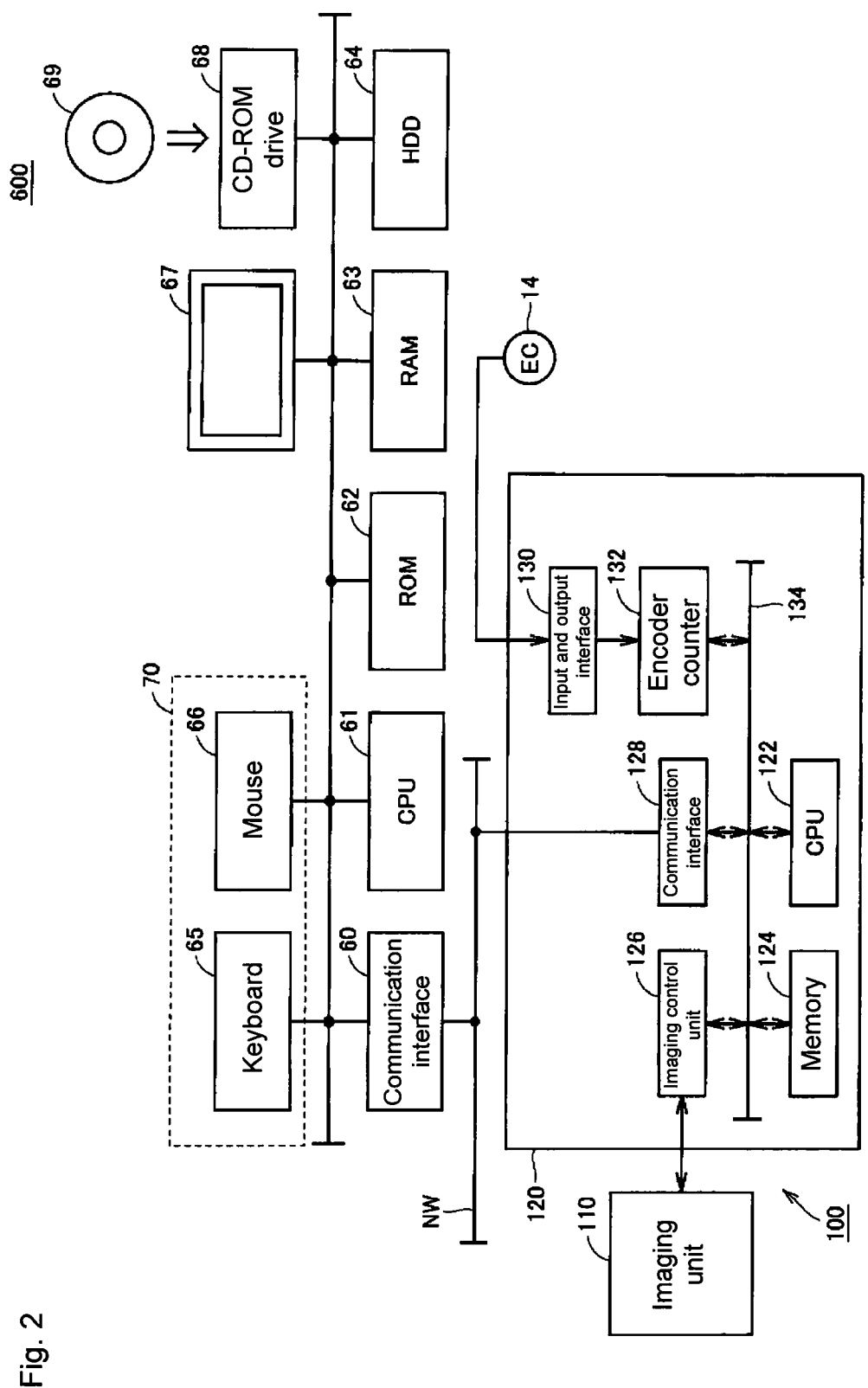
FIG. 2 is a schematic diagram illustrating a hardware configuration of the image processing device according to the first embodiment.

FIG. 2 is a schematic diagram illustrating a hardware configuration of the image processing device according to the first embodiment of the invention. The image processing device includes the visual sensor 100 and the support device 600 that has a function to generate and present information supporting the installation of the visual sensor 100. The function of the support device 600 may be replaced for the operation display device 500 connected to the network NW.

Typically, the support device 600 is constructed by a general-purpose computer. Preferably the support device 600 is constructed by a notebook personal computer having excellent portability from the viewpoint of maintenance.

Referring to FIG. 2, the support device 600 includes a communication interface (I/F) 60 that conducts communication with the visual sensor 100, a CPU 61 that executes various programs including an OS (Operating System), a ROM (Read Only Memory) 62 in which a BIOS and various pieces of data are stored, a memory RAM 63 that provides a working area where the data necessary for the CPU 61 to execute the program is stored, and a hard disk drive (HDD) 64 in which the program and the like executed by the CPU 61 are stored in a nonvolatile manner.

The support device 600 also includes an operation unit 70 (including a keyboard 65 and a mouse 66) that receives an operation from a user and a monitor 67 that is constructed by a liquid crystal display in order to present the information to the user.

As described later, various programs executed by the support device 600 are distributed while stored in a CD-ROM 69. The one or more programs stored in the CD-ROM 69 is read by a CD-ROM (Compact Disk-Read Only Memory) drive 68, and stored in the hard disk drive (HDD) 64. Alternatively, the program(s) may be downloaded from the upper-level host computer through the network.

As described above, the support device 600 is constructed by the general-purpose computer. In the first embodiment, the operation unit 70 that receives the operation of an operator and the monitor 67 that displays the information are separately provided. Alternatively, the operation unit 70 and the monitor 67 may be provided integrally as a touch panel.

Because the support device 600 can conduct data communication with both the visual sensor 100 and the robot control device 200, the support device 600 can collect various pieces of data.

Referring to FIG. 2, the visual sensor 100 includes the imaging unit 110 and the captured image processing unit 120. The captured image processing unit 120 conducts communication with the support device 600. The robot control device 200 and the operation display device 500 are not given in FIG. 2.

In FIG. 2, the image processing device that receives and processes the captured image obtained by the imaging unit 110 is configured to include the functions of the captured image processing unit 120 and the support device 600.

The imaging unit 110 is a device that captures the image of the subject existing in the imaging visual field. The imaging unit 110 includes an optical system such as a lens and a diaphragm, and a light receiving element such as a CCD (Charge Coupled Device) image sensor and a CMOS (Complementary Metal Oxide Semiconductor) image sensor as a main structural element. The imaging unit 110 performs the imaging in response to the instruction from the captured image processing unit 120, and outputs the image data obtained by the imaging to the captured image processing unit 120.

The captured image processing unit 120 includes a CPU (Central Processing Unit) 122, a memory 124, an image control unit 126, a communication interface (interface) 128, an input and output interface (interface) 130, an encoder counter 132, and a memory interface (interface) in which a CD-ROM (Compact Disk-Read Only Memory), as an example of a detachable recording medium, is loaded. These components are connected to one another through a bus 134 so to be able to conduct data communication with one another.

The CPU 122 is a processor that performs a main calculation in the captured image processing unit 120. Various programs executed by the CPU 122, the image data captured by the imaging unit 110, and various parameters are stored in the memory 124. Typically, the memory 124 includes a volatile storage device such as a DRAM (Dynamic Random Access Memory) and a nonvolatile storage device such as a FLASH memory.

The image control unit 126 performs the imaging action in the connected imaging unit 110 in response to an internal command from the CPU 122 or the like. The image control unit 126 includes an interface that transmits various commands to the imaging unit 110 and an interface that receives the image data from the imaging unit 110.

The communication interface 128 exchanges various pieces of data with operation display device 500. Typically, the visual sensor 100 and the operation display device 500 are connected to each other through an Ethernet (registered trademark) connection, and the communication interface 128 is hardware compliant with an Ethernet (registered trademark) type connection.

The input and output interface 130 outputs various signals to the outside from the captured image processing unit 120, and inputs various signals from the outside. Particularly, the input and output interface 130 receives the pulse signal generated by the encoder 14, converts the pulse signal into a digital signal, and outputs the digital signal to the encoder counter 132.

The encoder counter 132 counts the number of pulses included in the pulse signal from the encoder 14, and outputs a count value. Because basically the encoder counter 132 performs the action independently of a calculation cycle of the CPU 122, the encoder counter 132 certainly catches the number of pulses included in the pulse signal from the encoder 14.

<Functional Configuration>

Figure 3:
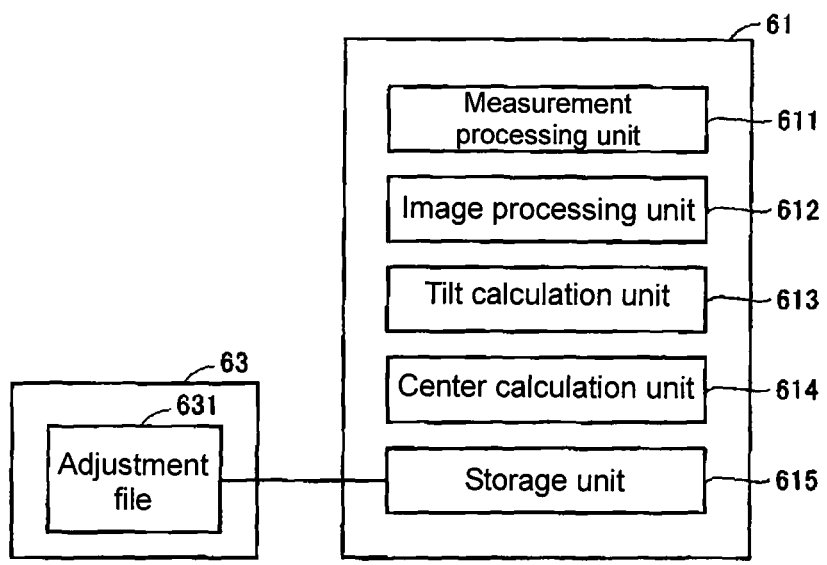
FIG. 3 is a schematic diagram illustrating a functional configuration of the image processing device according to the first embodiment.

A functional configuration related to the image processing will be described below with reference to FIG. 3. The CPU 61 receives image data, which is obtained by the imaging and output from the visual sensor 100 (the imaging unit 110), through the network NW. The CPU 61 includes a measurement processing unit 611, an image processing unit 612, a tilt calculation unit 613, a center calculation unit 614, and a storage unit 615 as functional components. These units process the image data received from the imaging unit 110, and produce and output the information presented to the operator.

The measurement processing unit 611 processes the received image data, and performs measurement processing to the image data. More specifically, the measurement processing unit 611 performs the measurement processing to captured image data to acquire coordinate positions of four marks of a target sheet 700 in the image. The tilt calculation unit 613 acquires the tilt angle with respect to the target sheet 700 of the imaging unit 110 from the coordinate positions of the four marks. The center calculation unit 614 acquires a gravity center of the target sheet 700 and a center of the captured image. The storage unit 615 corresponds to a kind of an output part. The storage unit 615 stores the image data acquired by the imaging of the imaging unit 110 and an image data measurement result of the measurement processing unit 611 in an adjustment file 631 of the RAM 63.

<Flowchart>

Figure 4:
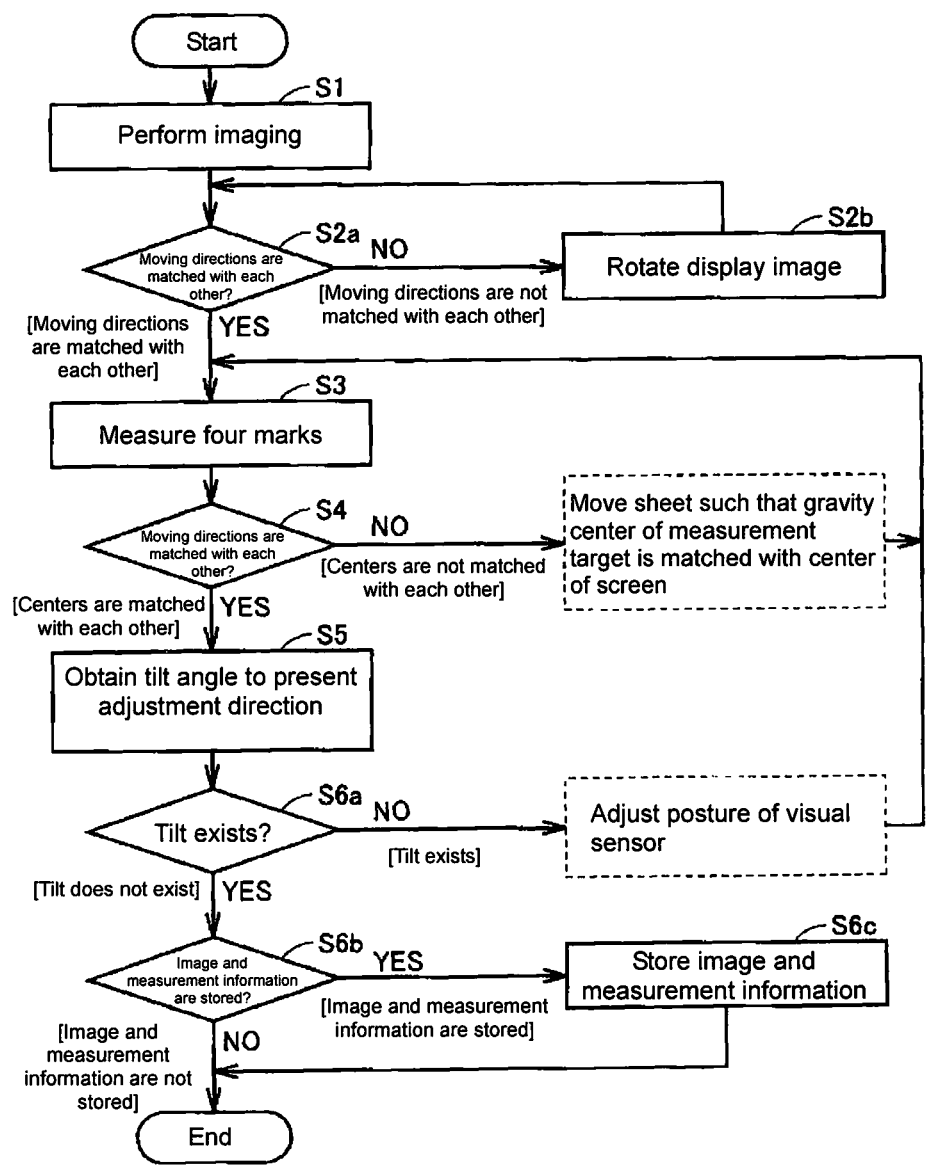
FIG. 4 is a flowchart of processing according to the first embodiment.

FIG. 4 is a flowchart of the entire processing according to the first embodiment of the invention.

An image processing procedure will be described with reference to FIG. 4. The operator attaches the visual sensor 100 with respect to a conveyer. The operator places the target sheet 700 in a predetermined position on the conveying path surface. It is assumed that the imaging visual field of the visual sensor 100 is a range including the predetermined position. At this point, the operator operates the operation unit 70 to input an imaging instruction. The CPU 61 receives the imaging instruction, and transmits the received imaging instruction to the visual sensor 100. Therefore, the image control unit 126 outputs the received imaging instruction to the imaging unit 110, and causes the imaging unit 110 to perform an imaging action. The imaging unit 110 captures the image of the subject in the imaging visual field, and outputs the image data acquired by the imaging action (Step S1).

It is assumed that the operator properly operates the operation unit 70 to input the imaging instruction when the target sheet 700 is moved or when a posture of the imaging unit 110 is changed.

The captured image data is transmitted to the support device 600 from the visual sensor 100. The CPU 61 displays the received image data on the monitor 67. The operator checks the displayed image to move the target sheet 700. The display image is checked to determine whether a direction in which the target sheet 700 is moved is matched with a direction in which the display image of the monitor 67 is moved (Step S2a). That is, when the image moves in the vertical (perpendicular) direction on the screen of the monitor 67 while the target sheet 700 is moved to the direction in which the workpiece is conveyed by the conveyer 10, the determination that the moving directions are not matched with each other is made (NO in Step S2a), and the operator operates the operation unit 70 to rotate the displayed image (Step S2b). Then the processing goes to Step S2a.

When determining that the directions are matched with each other, the operator operates the operation unit 70 to issues an instruction to start the measurement (YES in Step S2a). In response to the instruction to start the measurement, the measurement processing unit 611 performs the measurement processing to the image data, measures the four marks on the target sheet 700, and displays the information matching the gravity center of the target sheet 700 based on the measurement result with the center of the image on the monitor screen (Step S3). At this point, the image on the monitor screen corresponds to the image of the imaging visual field of the imaging unit 110, namely, the captured image. Because the target sheet 700 can be disposed in the imaging visual field, the captured image includes the target sheet 700.

Search processing in which pattern matching is used based on a model image of the previously-registered mark can be cited as a typical example of the measurement processing. In the search processing, a feature portion of the mark is previously registered as an image pattern (model)

and a portion most similar to the previously-registered model is searched from the input image. At this point, a position, an inclination, and a rotation angle of the portion most similar to the model, and a correlation value indicating how much similar it is to the model, are calculated.

In the measurement processing, the mark may be detected by performing edge extraction processing to the image data.

Based on the measurement result, the center calculation unit 614 acquires the positions of the center of the imaging visual field (the captured image) and the gravity center of the image of the target sheet 700. The images expressing the center and the gravity center are displayed on the monitor 67. Therefore, a positional deviation amount between the center and the gravity center is displayed The operator checks whether the positional deviation between the center and the gravity center exists, namely, whether the positions are matched with each other, from the display image on the monitor 67. The operator operates the operation unit 70 according to a checking result. For example, when the positions are not matched with each other, after the operator moves the target sheet 700 in order to match the center and the gravity center with each other, the operator operates the operation unit 70 to issue the instruction to start the measurement.

When receiving the operation from the operation unit 70 (NO in Step S4), the CPU 61 inputs the instruction to start the measurement, and therefore the processing goes to Step S3. Therefore, the image of the post-movement target sheet 700 is captured, and the measurement processing unit 611 performs the measurement processing to the image data acquired by the imaging.

On the other hand, when determining that the operation unit 70 is not operated (YES in Step S4), the CPU 61 outputs the information assisting the posture adjustment of the imaging unit 110 (Step S5).

Specifically, the tilt calculation unit 613 calculates the tilt angle from the coordinate positions of the four marks acquired by the measurement processing. As used herein, the tilt angle is a degree of a tilt of a surface (hereinafter referred to as an imaging visual field surface) of the imaging visual field of the imaging unit 110 to a surface (hereinafter referred to as a conveying surface) on the conveying path of the line 1. The tilt angle is acquired as a value in which the value of 1 is obtained when the surfaces are parallel to each other. It is assumed that the conveying surface is a plane. Based on the tilt angle, the image processing unit 612 outputs assist information for adjusting the posture of the imaging unit 110.

The operator checks the output information. When checking that the tilt exists, the operator operates the operation unit 70 and adjusts the posture of the visual sensor 100.

When the CPU 61 determines that the operator's operation is received through the operation unit 70 (NO in Step S6a), the processing goes to Step S3. Therefore, the visual sensor 100 performs the imaging action after the posture adjustment, and the pieces of processing (processing steps or actions) from Step S3 are similarly performed to the image data acquired by the imaging.

On the other hand, when determining that the tilt does not exist, the operator does not operate the operation unit 70. Accordingly, the CPU 61 determines that the operation is not received from the operation unit 70 (YES in Step S6a), and the processing goes to Step S6b.

In Step S6b, the CPU 61 determines whether the operation to input a storage instruction through the operation unit 70 is carried out. In the CPU 61, when the storage instruction is inputted based on the received operation (YES in Step S6b), the storage unit 615 stores the information on the image data and the information on the measurement result in the adjustment file 631 of the RAM 63, while correlating the information on the image data and the information on the measurement result with each other based on the storage instruction (Step S6c). On the other hand, when the CPU 61 determines that the operation related to the storage instruction is not received (NO in Step S6b), the storage unit 615 does not perform the processing of storing the information in the adjustment file 631, and the sequence of the pieces of processing is ended. Each of the pieces of processing is described in detail later.

<Target Sheet>

Figure 5:
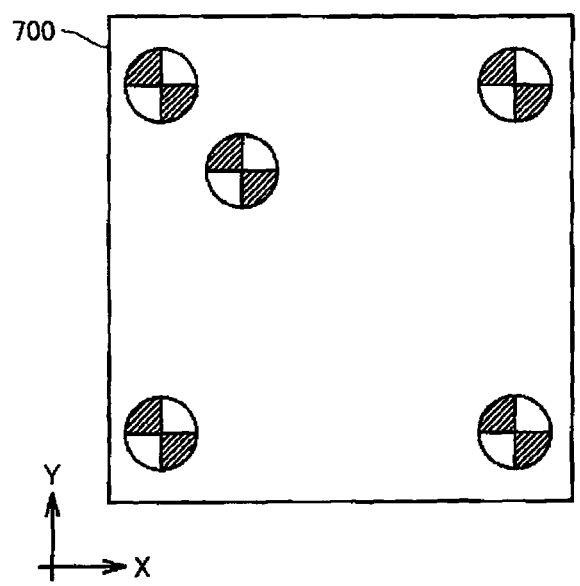
FIG. 5 is a view schematically illustrating a target sheet according to the first embodiment.

FIG. 5 is a view schematically illustrating the target sheet 700 according to the first embodiment of the invention. Referring to FIG. 5, a target pattern used to adjust the posture of the visual sensor 100 is drawn in the substantially square target sheet 700. The target pattern includes five circles (hereinafter referred to as marks) in each of which the inside is two-toned by about 90°.

Basically the three marks are enough to adjust the posture. However, the four marks disposed at four vertices of the square target sheet 700 are used because the information adjusting accurately the posture can be acquired with increasing accuracy by increasing the number of marks. The additionally-disposed fifth mark is used to align the direction in which the target sheet 700 is disposed with a predetermined direction. In the first embodiment, the mark has the circular shape. However, there is no limitation to the shape of the mark.

In Step S1 of FIG. 4, the operator disposes the target sheet 700 in which the target pattern is drawn in the imaging visual field of the visual sensor 100 (the imaging unit 110) on the line 1. The operator provides the imaging instruction to the visual sensor 100. The visual sensor 100 transmits the image (the image including the target pattern as the subject) obtained by the imaging to the support device 600.

In the support device 600, the measurement processing unit 611 performs the measurement processing to the received image data. In the measurement processing, the coordinate value of the center point is determined for each of the four marks disposed at four corners included in the target pattern. Therefore, a coordinate value [pix] of an image coordinate system is acquired for each of the four marks included in the target pattern. The acquired four coordinate values correspond to (X1, Y1), (X2, Y2), (X3, Y3), and (X4, Y4).

Figure 6:
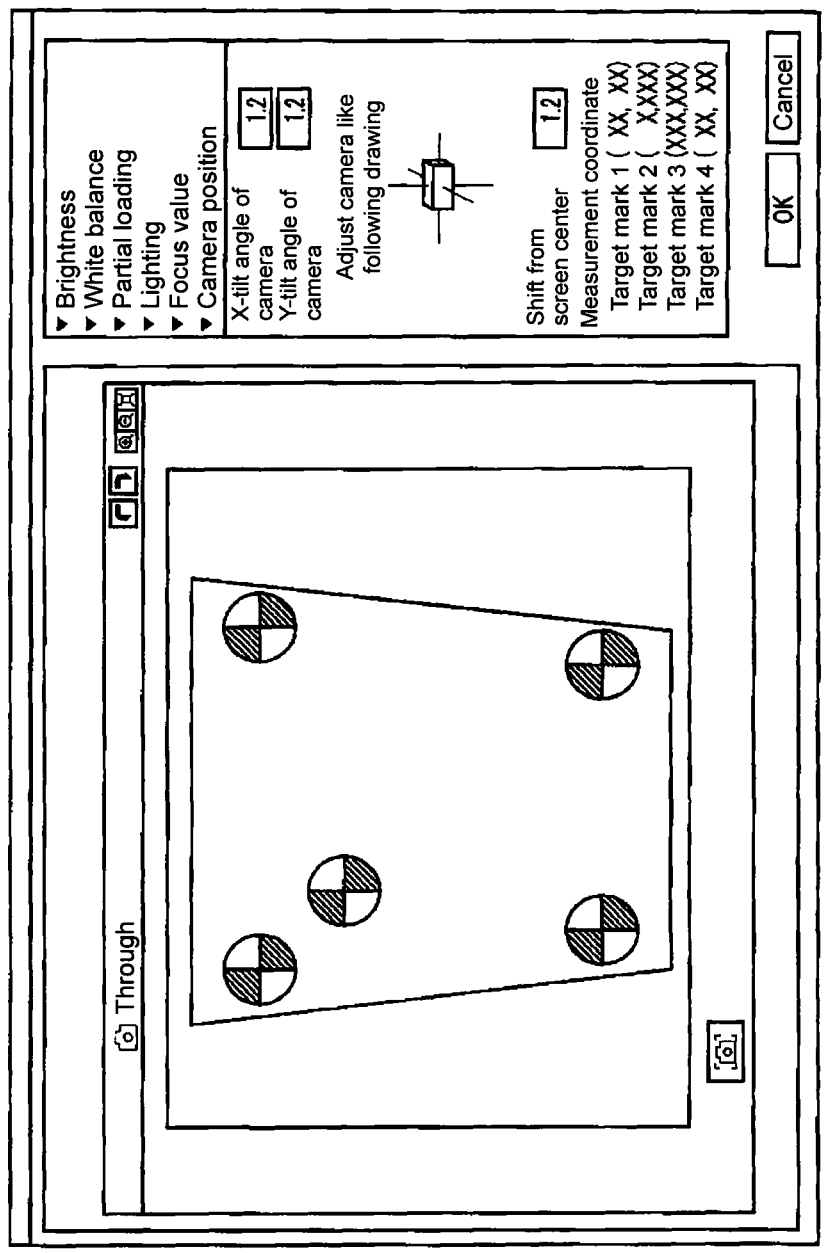
FIG. 6 is a view illustrating a display example of a captured image including the target sheet according to the first embodiment.

FIG. 6 is a view illustrating a display example of a captured image including the target sheet 700 according to the first embodiment of the invention. When the operator installs the visual sensor 100 on the line 1, frequently the imaging visual field surface is not parallel to the conveying surface in which the target sheet 700 is disposed. For this reason, as illustrated in FIG. 6, the image of the target sheet 700 is displayed into not the square shape but a deformed shape (a trapezoidal shape).

Figure 7:
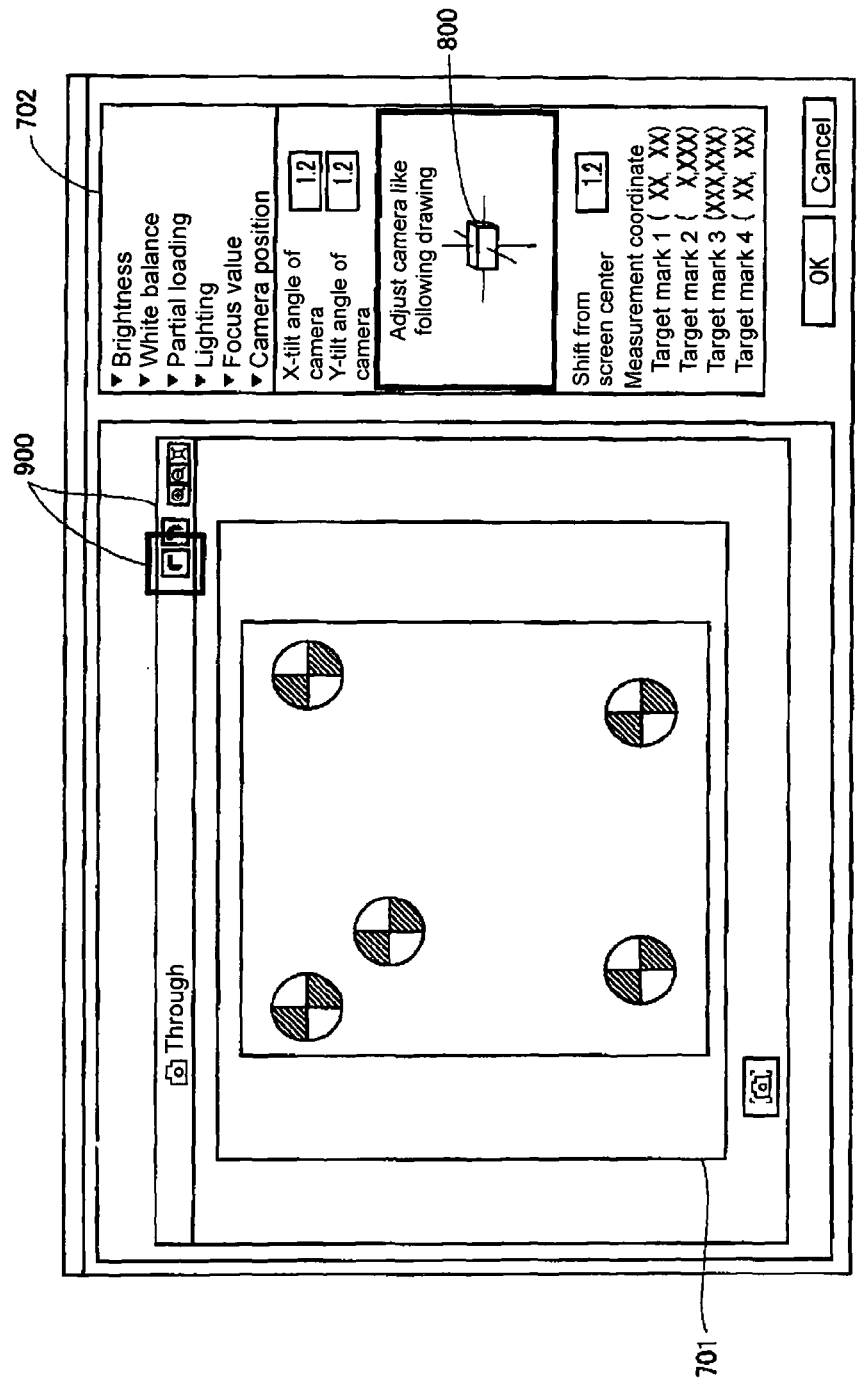
FIG. 7 is a view illustrating an example of a screen on which the captured image according to the first embodiment is displayed.
Figure 8:
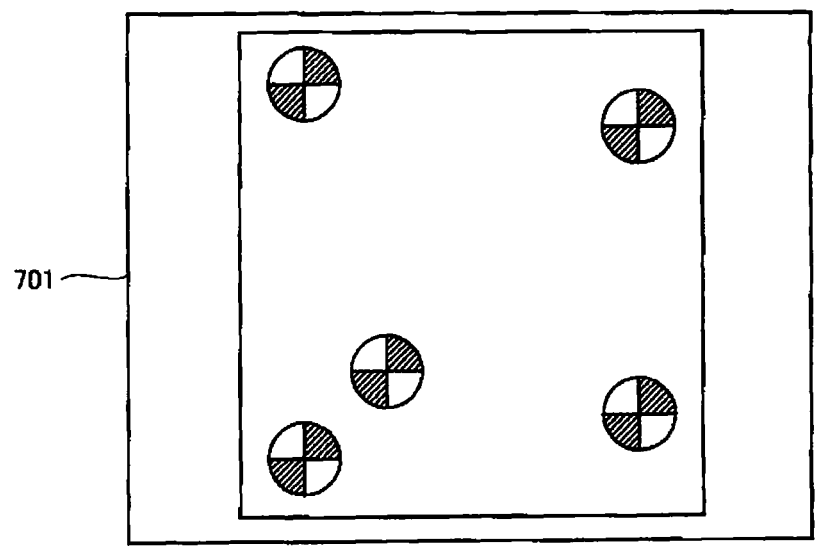
FIG. 8 is an enlarged view of the captured image in FIG. 7.
Figure 9:
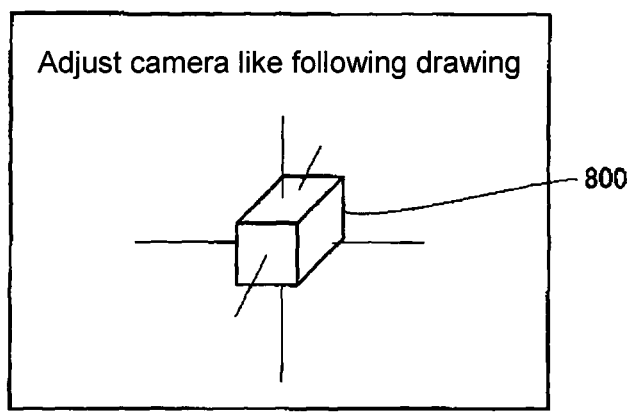
FIG. 9 is a view illustrating an image expressing a visual sensor in FIG. 7.

FIGS. 7 to 9 are views illustrating an example of the screen on which the captured image according to the first embodiment of the invention is displayed. Referring to FIG. 7, the screen of the monitor 67 includes a region 701 where the subject image (the image including the target sheet 700) of the imaging visual field is displayed and a region 702 where an image 800 schematically expressing the visual sensor 100 is displayed. Three axes (an X-axis, a Y-axis, and a Z-axis) orthogonal to one another in the center of the image 800 are displayed in association with the image 800 expressing the visual sensor 100. Therefore, the operator easily understands the installation of the visual sensor 100 as the mode installed in a space from the image 800. The X-axis and the Y-axis of the visual sensor 100 correspond to the X-axis and the Y-axis of the coordinate system of the captured image output from the imaging unit 110.

A button 900 is also displayed on the screen of the monitor 67 in order to rotate the image of the region 701 clockwise or counterclockwise by 90 degrees. When the operator operates the button 900, the CPU 61 receives the operation to output a rotation instruction to the image processing unit 612.

In response to the rotation instruction, the image processing unit 612 rotates the image (the image of the target sheet 700) of the region 701 in clockwise and counterclockwise directions by 90 degrees (see FIG. 8). The image processing unit 612 also rotates the image 800 of the region 702 in the identical directions (see FIG. 9). Therefore, by operating the button 900, the operator can rotate the image of the region 701 on the identical screen, and rotate the image 800 of the region 702 in the identical directions in conjunction with the rotation.

As to the rotation direction, in the first embodiment, the image is rotated in the clockwise and counterclockwise directions by 90 degrees. Alternatively, the operator may variably change the rotation angle.

Figure 10:
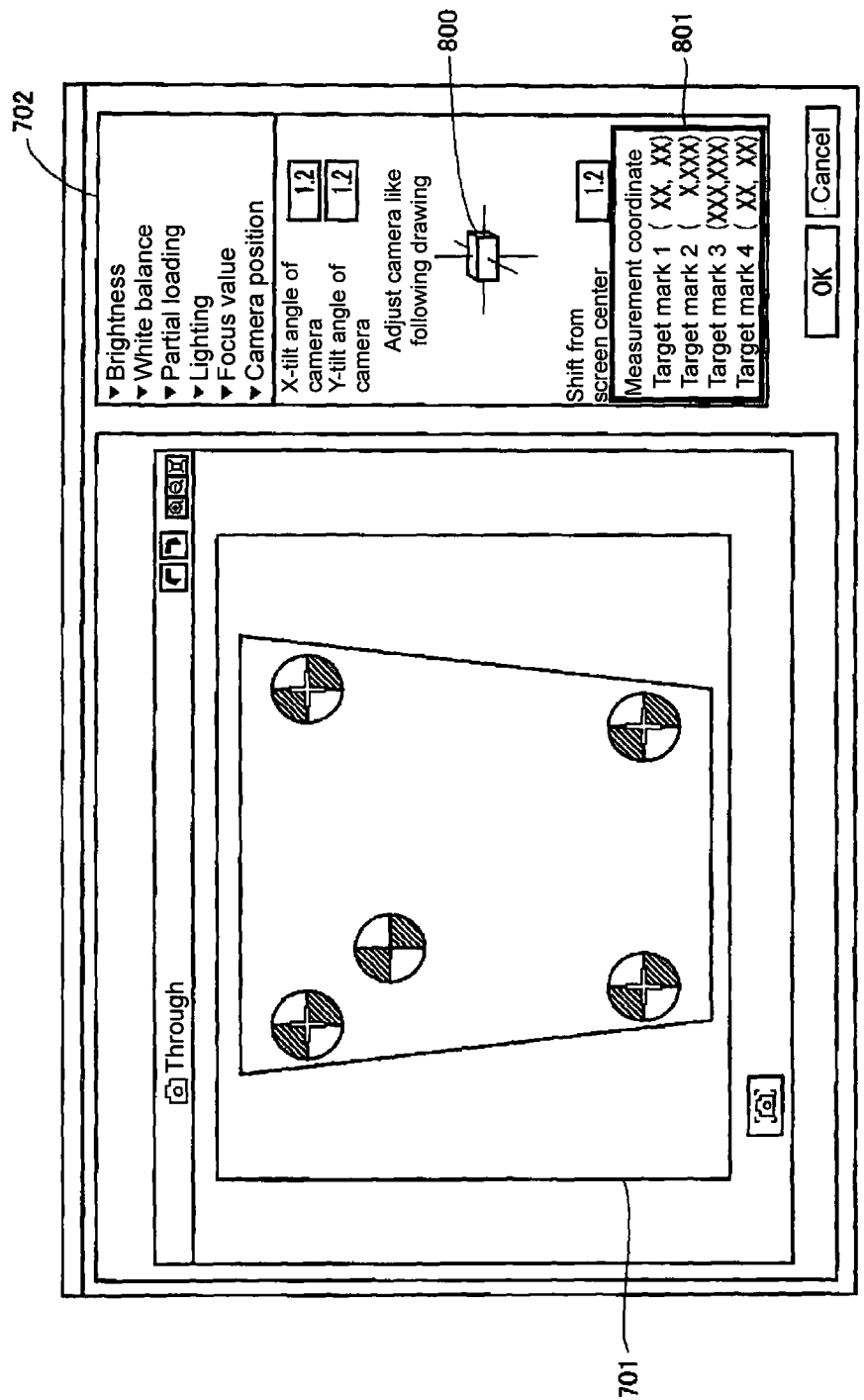
FIG. 10 is a view illustrating a display example of the captured image including the target sheet according to the first embodiment.
Figure 11:
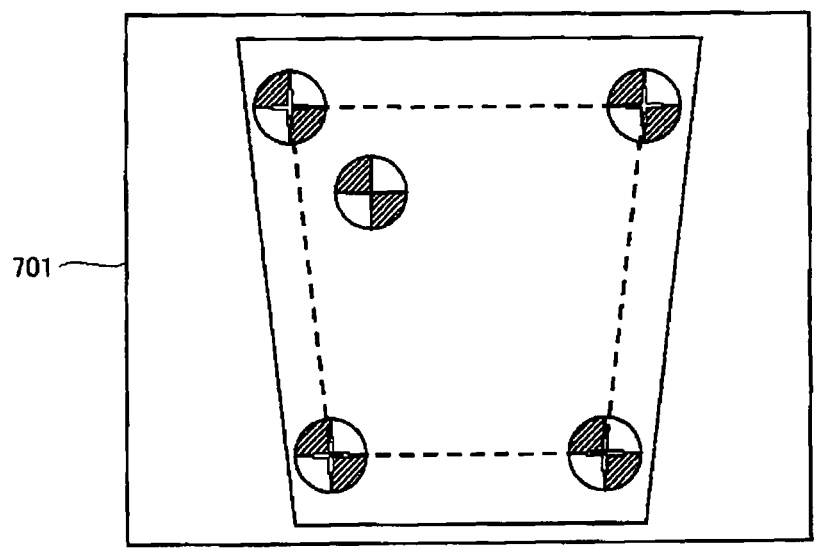
FIG. 11 is a view illustrating a display example of the captured image including the target sheet according to the first embodiment.

FIGS. 10 and 11 are views illustrating a display example of the captured image including the target sheet according to the first embodiment of the invention. In the processing in Step S3, the image processing unit 612 displays the image in FIG. 10. Referring to FIG. 10, coordinate values 801 (coordinate values (X1, Y1), (X2, Y2), (X3, Y3), and (X4, Y4)) of the four marks acquired by the measurement processing of the image of the region 701 are displayed in the region 702 of the screen. A "+" symbol is displayed in the measured center position while superimposed on each mark in the region 701. At this point, the position of each mark is indicated by both the coordinate value 801 and the "+" symbol. Alternatively, the position of each mark may be indicated by only one of the coordinate value 801 and the "+" symbol. A rectangular shape formed by connecting the four "+" symbols using a line is also displayed.

The operator checks that the centers of the four marks indicate the vertices of the square from the coordinate values 801, which allows the operator to understand that the imaging visual field surface and the conveying surface are parallel to each other.

As illustrated in FIG. 11, the image processing unit 612 may display the information expressing the tilt angle such that the operator can easily understand that the imaging visual field surface and the conveying surface are parallel to each other. That is, the line (corresponds to a broken line in FIG. 11) connecting the measured center positions is displayed with respect to the four marks in the region 701. When the imaging visual field surface and the conveying surface are not parallel to each other, the shape formed by the line connecting the four points is presented, not by the square, but by a deformed graphic (a trapezoid) as illustrated in FIG. 11, so that the operator can easily understand that the imaging visual field surface and the conveying surface are not parallel to each other. Accordingly, the tilt angle expresses a degree of deformation of the shape of the target sheet 700 in the captured image from the original square.

The operator can understand the degree of deformation (the tilt angle) by visually recognizing a difference in length between the upper bottom and the lower bottom of the trapezoid.

Figure 12:
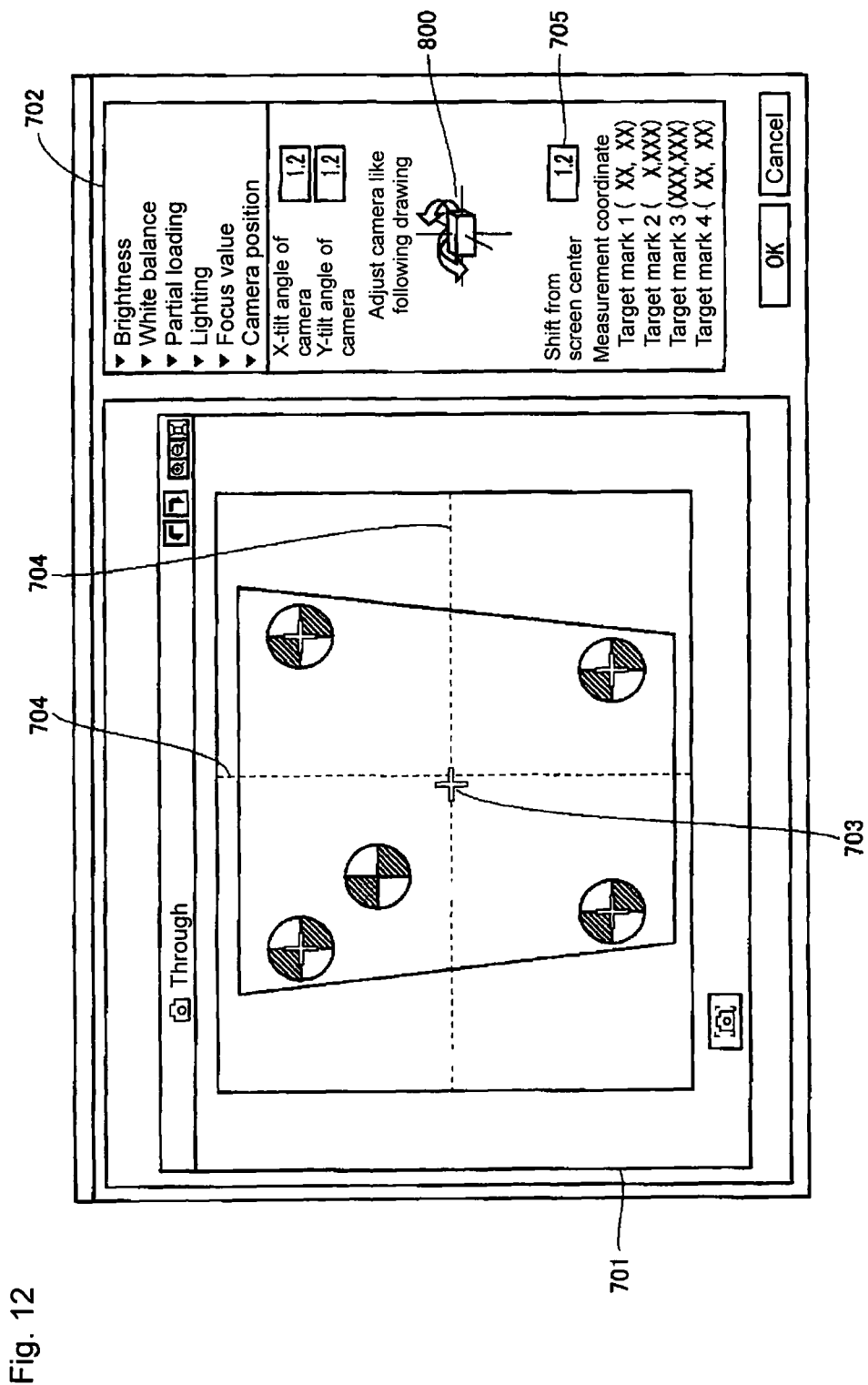
FIG. 12 is a view of a screen example illustrating measurement processing according to the first embodiment.
Figure 13:
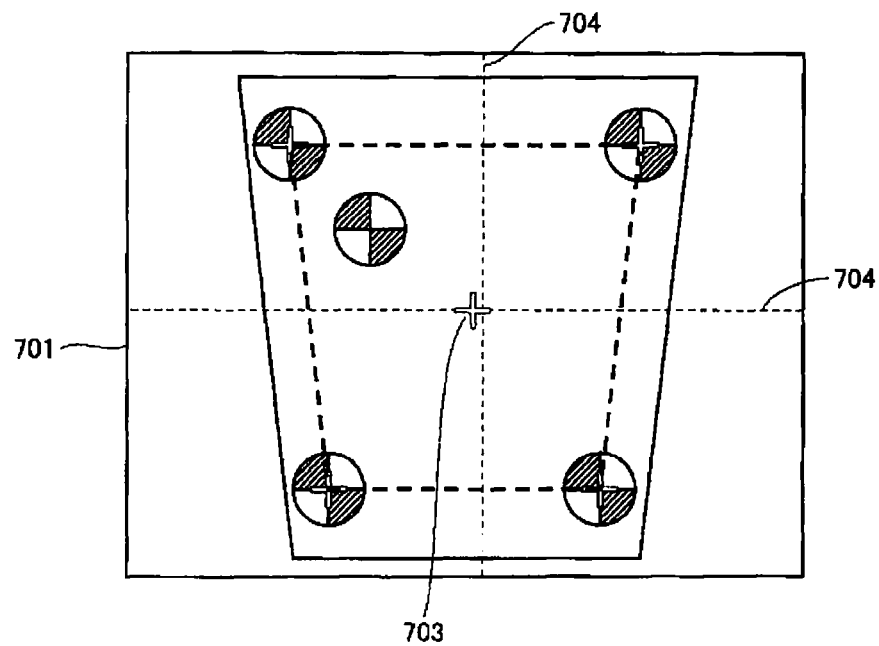
FIG. 13 is another view of a screen example illustrating the measurement processing according to the first embodiment.

The information expressing the tilt angle can also be displayed as illustrated in FIGS. 12 and 13. Referring to FIG. 12, the coordinate of the gravity center of the graphic formed by connecting the centers of the four marks using the straight line is calculated. An image 703 is displayed in the corresponding coordinate position of the region 701. The center of the region 701, namely, the center of the captured image, is presented using an intersection point of two broken-line axes orthogonal to each other.

Therefore, whether the center position of the captured image and the position of the image 703 are shifted from each other can be illustrated. The tilt angle can be presented as the deviation amount. Accordingly, the operator may adjust the posture of the visual sensor 100 such that the center of the region 701 is matched with the position of the image 703. At this point, the image processing unit 612 may calculate a distance between the center of the captured image and the image 703 as the assist information for the adjustment, and display the calculated value as data 705. The four marks may be connected by the broken-line straight line in order to clearly indicate that the image 703 is the gravity center (see FIG. 13).

<Direction for Posture Adjustment>

Figure 14:
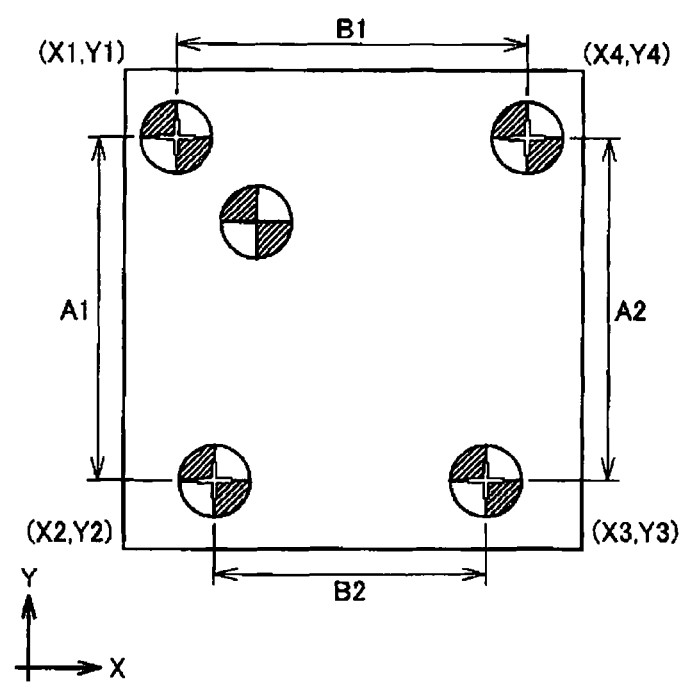
FIG. 14 is a view illustrating a procedure to determine a direction for a posture adjustment according to the first embodiment.
Figure 15:
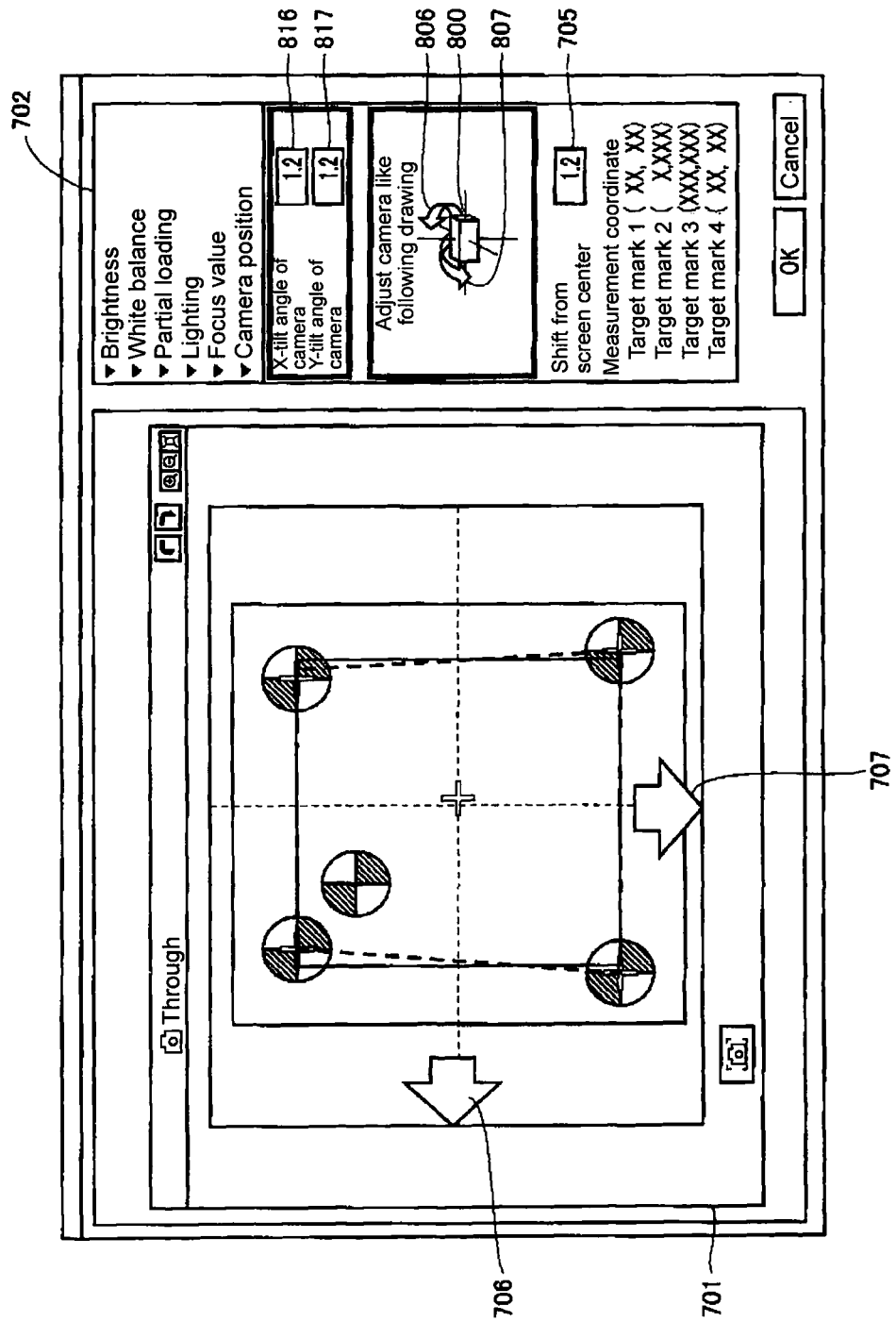
FIG. 15 is a view illustrating a screen on which the direction is displayed in order to adjust the posture according to the first embodiment.

FIG. 14 is a view illustrating a procedure to determine a direction for a posture adjustment according to the first embodiment of the invention. FIG. 15 is a view illustrating a screen on which the direction is displayed in order to adjust the posture according to the first embodiment of the invention.

A tilt angle calculation procedure performed by the tilt calculation unit 613 will be described with reference to FIG. 14. The tilt calculation unit 613 calculates the tilts in the X-direction and the Y-direction based on the coordinate values (X1, Y1), (X2, Y2), (X3, Y3), and (X4, Y4) of the four marks. The X-direction and the Y-direction are matched with the direction in which the X-axis of the image coordinate system extends and the direction in which the Y-axis extends, respectively.

A1 and A2 are calculated as: A1=|Y1−Y2| and A2=|Y4−Y3|. When the determination that a condition of (A1/A2)>1 holds is made with respect to the tilt in the X-direction, the image processing unit 612 displays a left-pointing arrow 706 on the screen (see FIG. 15). When the determination that a condition of (A1/A2)<1 holds is made, the image processing unit 612 displays a right-pointing arrow on the screen.

B1 and B2 are calculated as: B1=|X1−X4| and B2=|X2−X3|. When the determination that a condition of (B1/B2)>1 holds is made with respect to the tilt in the Y-direction, the image processing unit 612 displays an upward arrow on the screen. When the determination that a condition of (B1/B2)<1 holds is made, the image processing unit 612 displays a downward arrow 707 on the screen (see FIG. 15). These arrows are displayed in association with the image of the region 701.

Referring to FIG. 15, for the image 800 expressing the visual sensor 100, the image processing unit 612 also displays corresponding arrows 806 and 807 in conjunction with the display of the arrows 706 and 707. Therefore, the information on the direction in which the posture of the visual sensor 100 should be changed is presented.

Alternatively, in order to quantitatively express the tilt angle, pieces of data 816 and 817 of the tilt angles of the visual sensor 100 may be calculated and displayed together with, or independently of, the data 705. The data 816 is calculated by (A1/A2), and the data 817 is calculated by (B1/B2).

In the first embodiment, the images of the arrows 706 and 707 are used as the direction in which the posture of the visual sensor 100 should be changed. Alternatively, the direction may be presented using characters such as "left, right, up, and down".

The operator adjusts the posture of the visual sensor 100 by referring to the information including the tilt angle. At this point, the image processing unit 612 may display the square, which is formed by connecting the centers of the four marks of the target sheet 700 when the imaging visual field surface and the conveying path surface are parallel to each other, as the target of the posture adjustment.

Figure 16A:
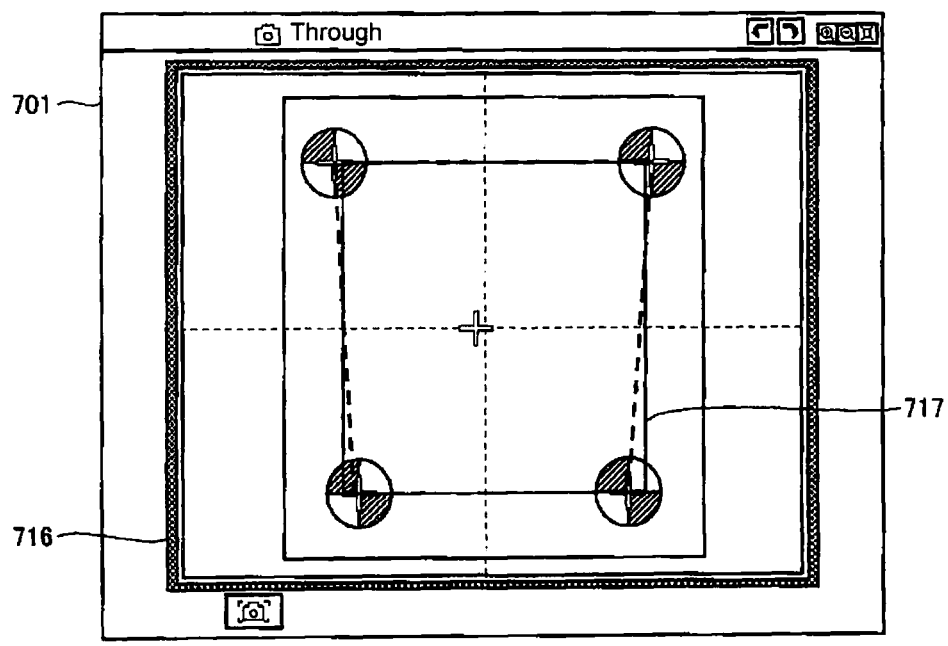
FIGS. 16A and 16B are views illustrating a display screen during the posture adjustment according to the first embodiment.
Figure 16B:
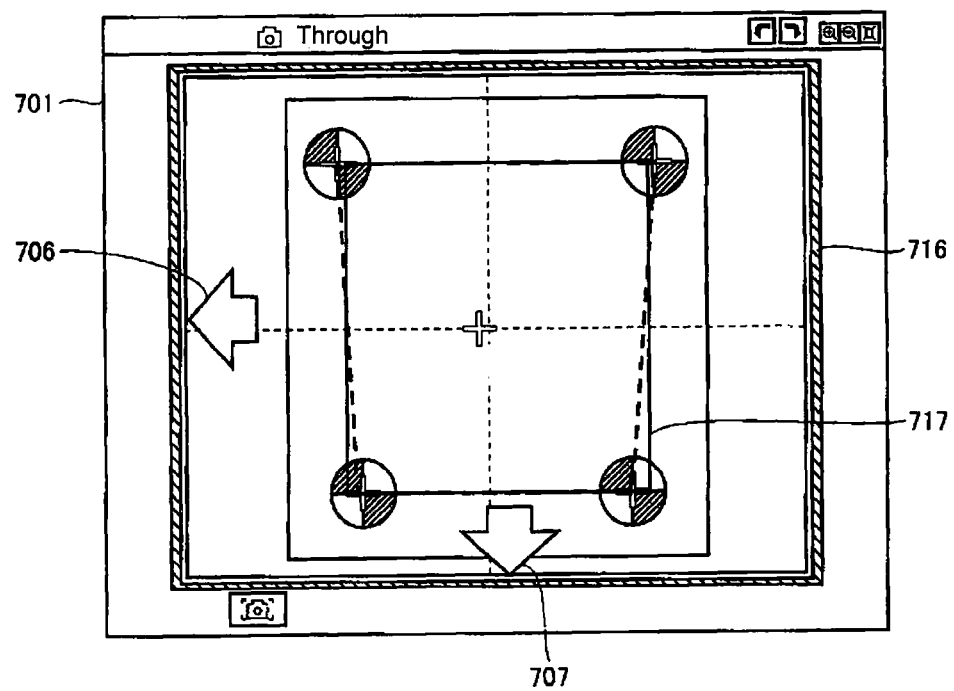

As a result of the posture adjustment, the determination that the posture of the visual sensor 100 falls-into or not-falls-into a range where a predetermined accuracy (for example, an accuracy of the measurement processing of the conveyed workpiece) can be guaranteed is made, and the information indicating the determination is outputted. For example, the image processing unit 612 calculates the values of (A1/A2) and (B1/B2) after the posture adjustment, and determines whether the calculated value falls into a predetermined range. For example, an image 716 is displayed as the information indicating the determination result (see FIGS. 16A and 16B). When the calculated value falls into the predetermined range, for example, the frame image 716 surrounding the region 701 is displayed in green and the arrows 706 and 707 are deleted as illustrated in FIG. 16A. When the calculated value does not fall into the predetermined range, for example, the image 716 is displayed in red (see FIG. 16B). Therefore, an indication of completion of the posture adjustment can be presented to the operator.

The information presented as the indication of the completion of the posture adjustment is not limited to the frame image 716, and a distinction of the display mode is not limited to the method in which the color is used.

Figure 17:
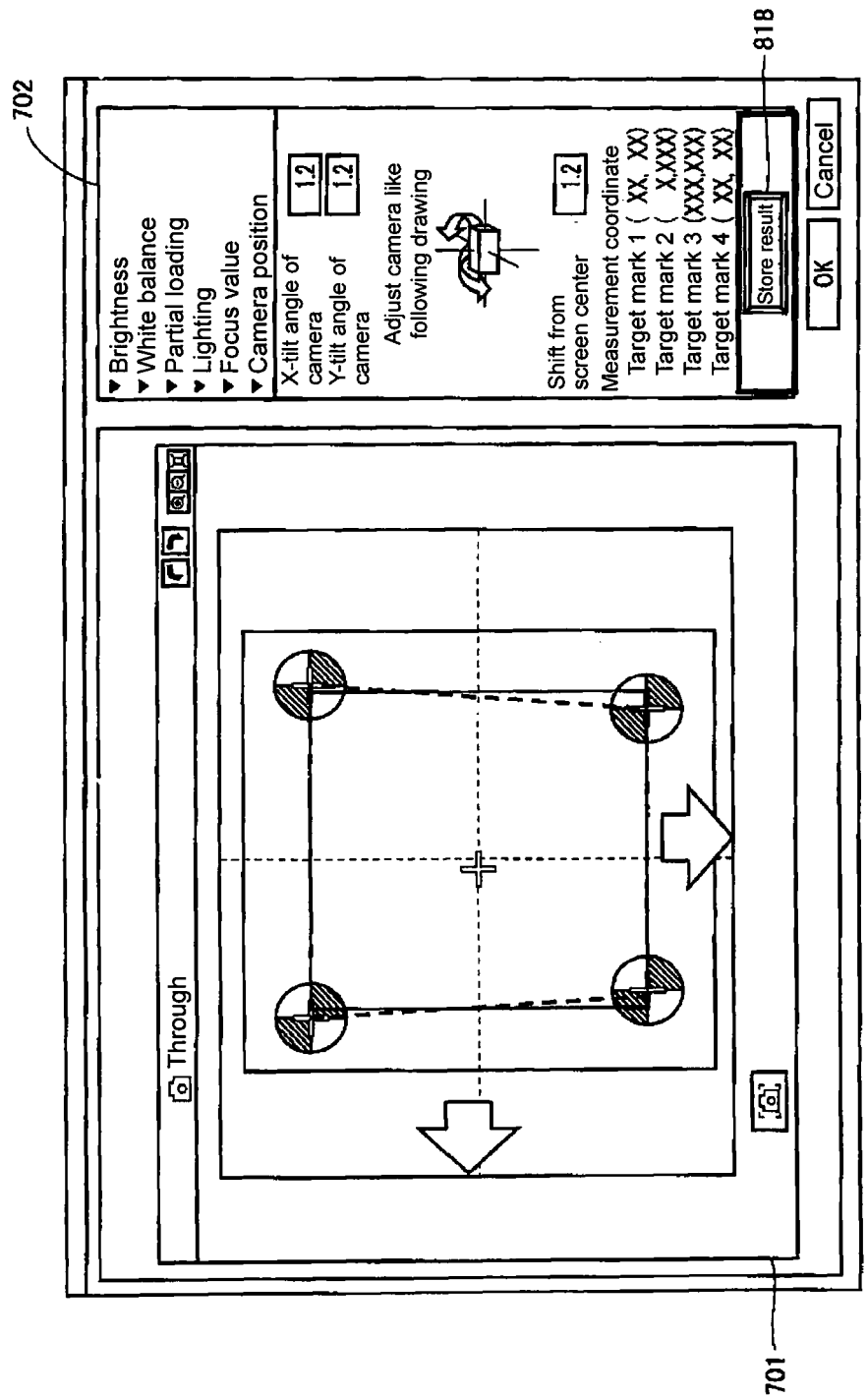
FIG. 17 is another view illustrating the display screen during the posture adjustment according to the first embodiment.

FIG. 17 illustrates an example of the image during the posture adjustment according to the first embodiment of the invention. Referring to FIG. 17, various pieces of information, such as the tilt angle, which are displayed during the posture adjustment are stored in a predetermined area of the RAM 63. Specifically, when the operator operates the button 818 on the screen, the storage instruction is provided to the storage unit 615. The storage unit 615 stores the data of the captured image displayed in the region 701 and various pieces of information displayed in the region 702 in the adjustment file 631 of the RAM 63. Thus, the data during the completion of the adjustment is stored in the adjustment file 631, which allows the data of the adjustment file 631 to be used as the assist information for the subsequent posture adjustment of the visual sensor 100.

[Second Embodiment]

The posture adjustment performed using the data of the adjustment file 631 in the visual sensor 100 will be described in a second embodiment. It is assumed that the captured image data displayed in the region 701 at the time the posture adjustment is completed and the pieces of data related to the measurement result and the tilt angle are stored in the adjustment file 631.

Figure 18:
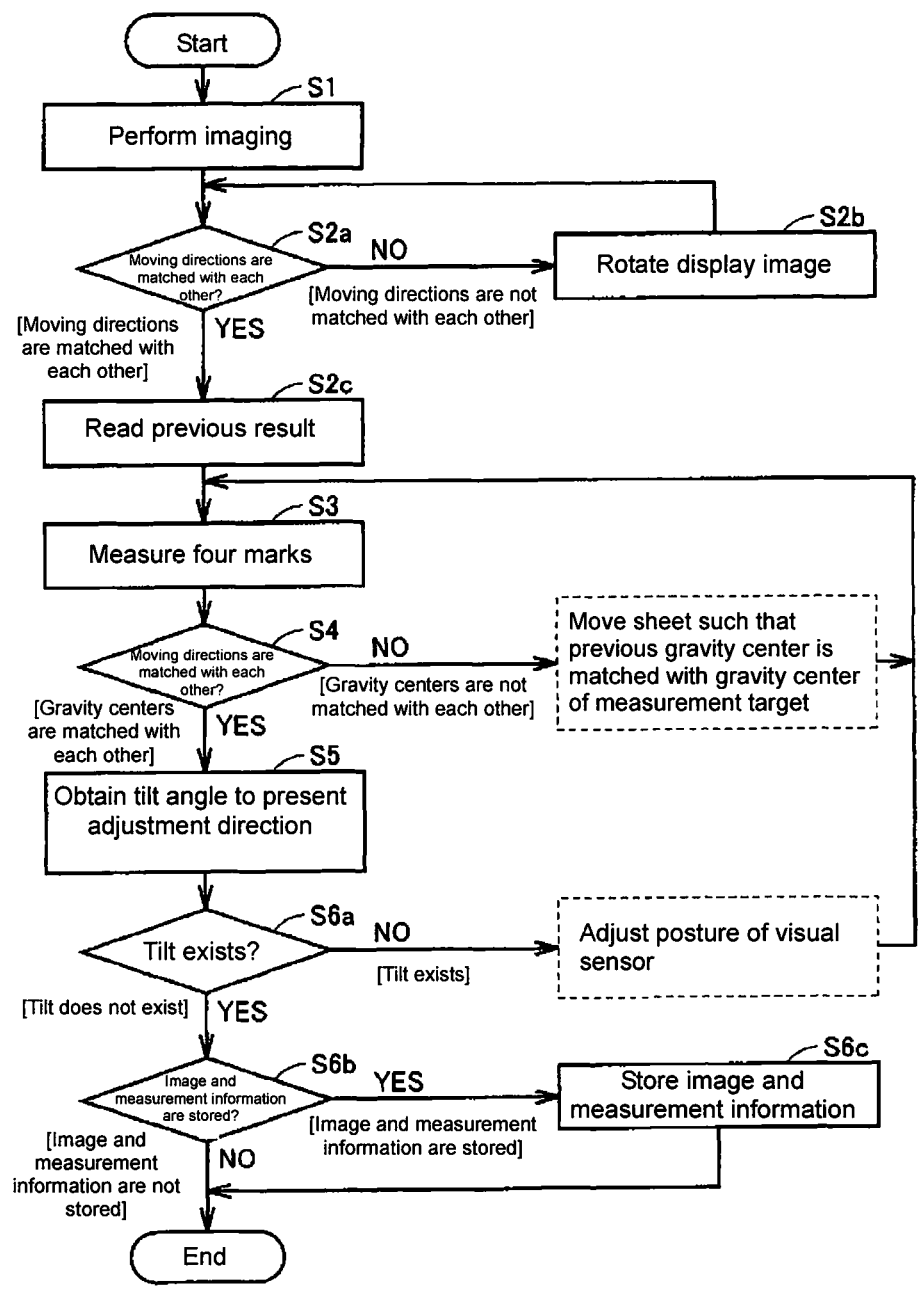
FIG. 18 is a flowchart of processing according to a second embodiment.

FIG. 18 is a flowchart of the entire processing according to the second embodiment of the invention. Referring to FIG. 18, when the visual sensor 100 is attached with respect to the conveyer, the target sheet 700 is placed in the predetermined position on the conveying path surface for the purpose of the posture adjustment, and the pieces of processing in Steps S1 to S2b are performed. Because the pieces of processing in Steps S1 to S2b are similar to those of the first embodiment, the detailed description is not given.

When a button 819 is operated, the image processing unit 612 reads the data from the adjustment file 631 of the RAM 63, and displays the image on the monitor 67 based on the read data (Step S2c). The measurement processing unit 611 performs the measurement processing to the captured image data acquired in Step S1, and the measurement result is displayed (Step S3).

Figure 19:
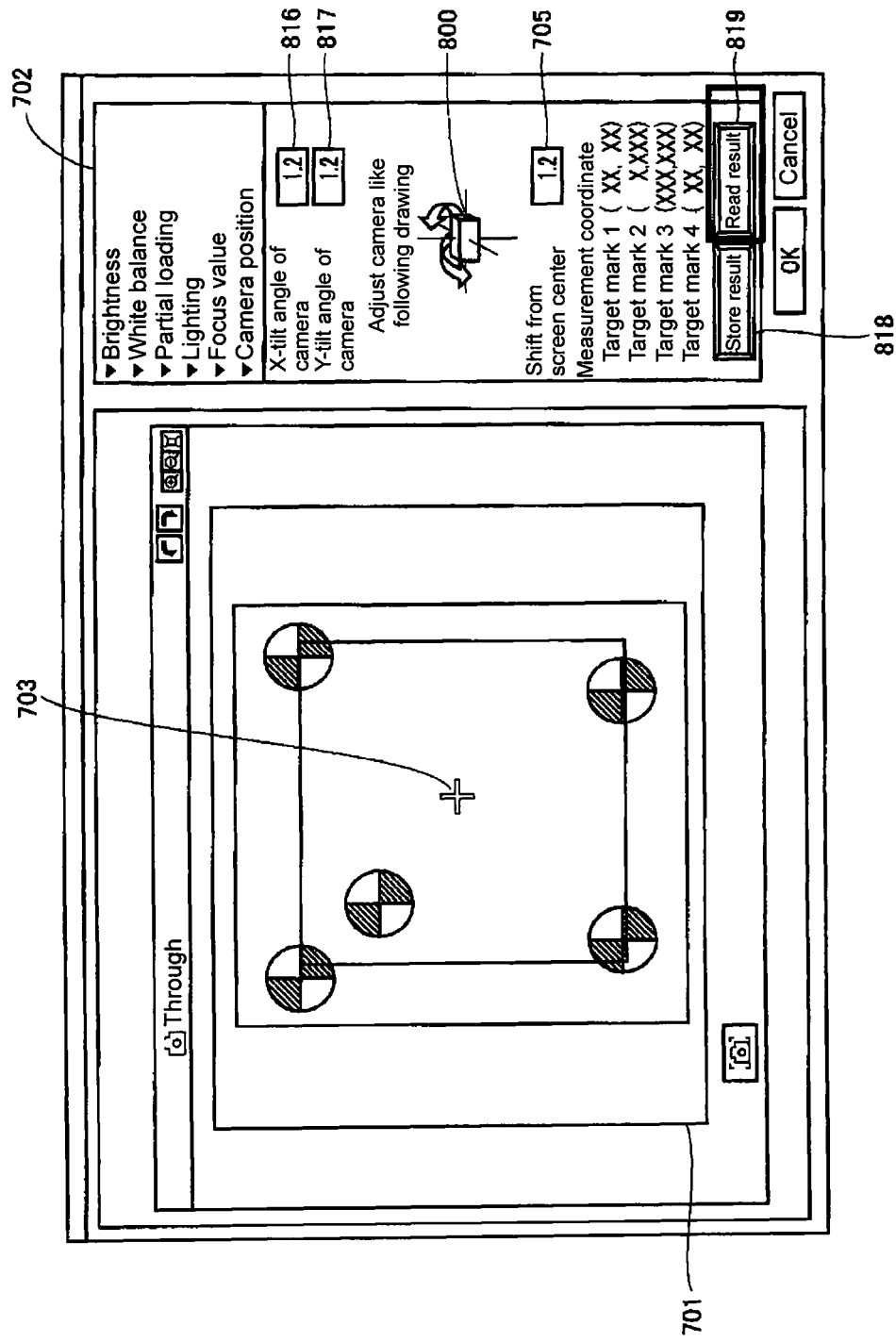
FIG. 19 is a view illustrating a display example of the captured image including the target sheet according to the second embodiment.

FIG. 19 is a view illustrating a display example of the captured image including the target sheet according to the second embodiment of the invention. Referring to FIG. 19, the captured image (the image including the target sheet 700) of the subject during the completion of the posture adjustment is displayed in the region 701, and the image 703 is displayed. The image 703 expresses the gravity center that is calculated from the center coordinates of the four marks acquired by performing the measurement processing to the captured image data. The tilt angles 816 and 817, the image 800 expressing the visual sensor 100, and the data 705 indicating the deviation amount between the gravity center of the captured image and the center of the screen are displayed in the region 702. The button 819 operated by the operator is also displayed in the region 702 in order to provide the instruction to display the information based on the data of the adjustment file 631.

Figure 20:
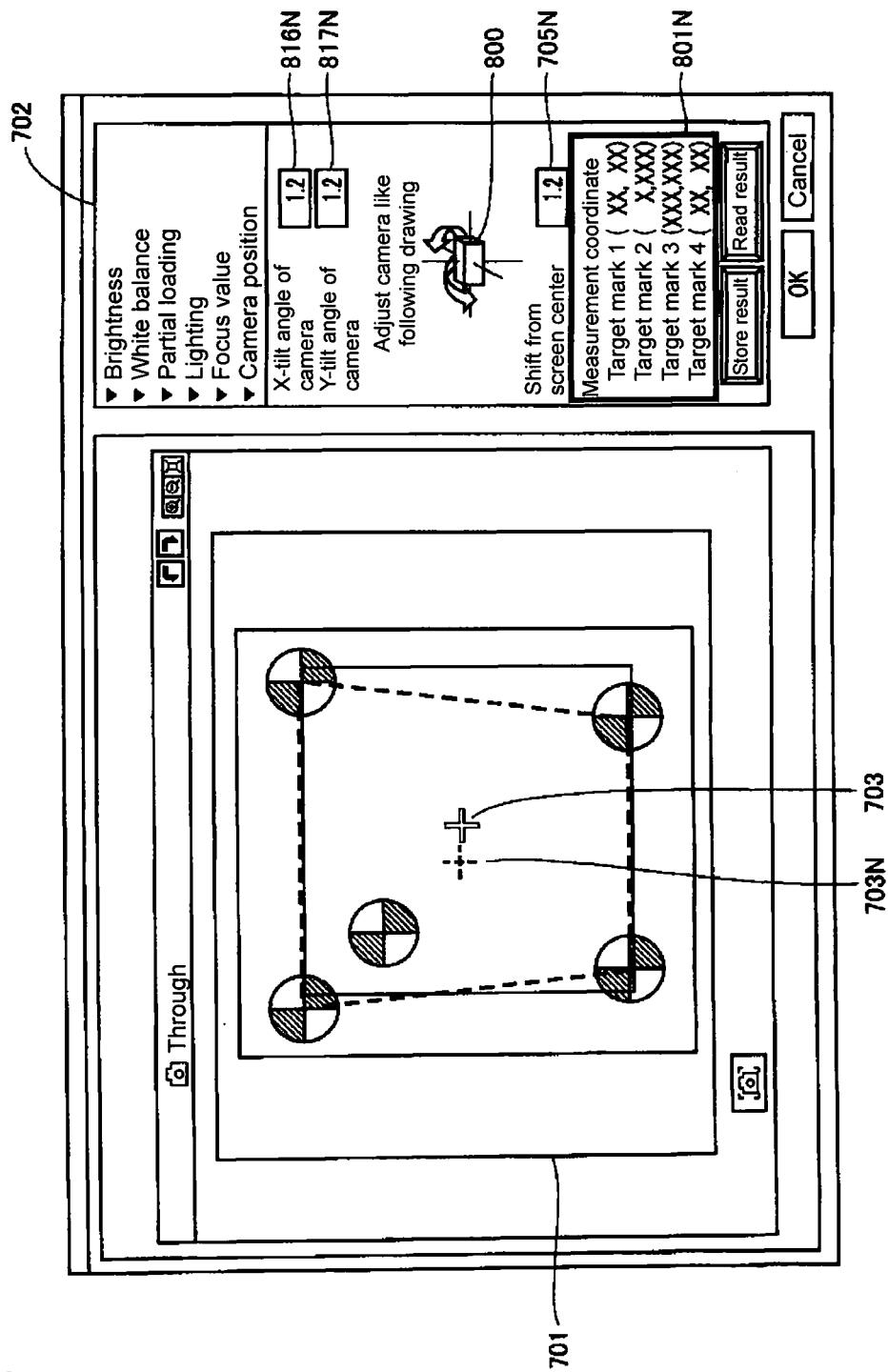
FIG. 20 is a view illustrating a display example of the captured image including the target sheet according to the second embodiment.

FIG. 20 illustrates a display example of the screen in Step S4. Referring to FIG. 20, the information based on the data of the adjustment file 631 and the information on the current measurement processing in Step S3 are simultaneously displayed on the screen.

Referring to FIG. 20, the image 703 of the gravity center based on the adjustment file 631 and an image 703N indicating the position coordinate of the gravity center, which is calculated by the center calculation unit 614 based on the center coordinates of the four marks acquired by the current measurement processing, are simultaneously displayed in the region 701. The square based on the center position coordinates of the four marks of the adjustment file 631, and the broken-line trapezoid based on the center position coordinates of the four marks acquired by the current measurement processing, are simultaneously displayed in the region 701. Coordinate values 801N of the center positions of the four marks acquired by the current measurement processing are displayed in the region 702. Pieces of data 705N, 816N, and 817N related to the tilt angles, which are acquired based on the coordinate values 801N, are displayed in the region 702.

According to the image in FIG. 20, the assist information for the posture adjustment can be presented from the display of the region 701 based on the information on the comparison between the result of the current measurement processing and the result of the measurement processing during the completion of the posture adjustment in the adjustment file 631. The assist information for the posture adjustment based on the result of the current measurement processing can be presented by the information displayed in the region 702.

Figure 21:
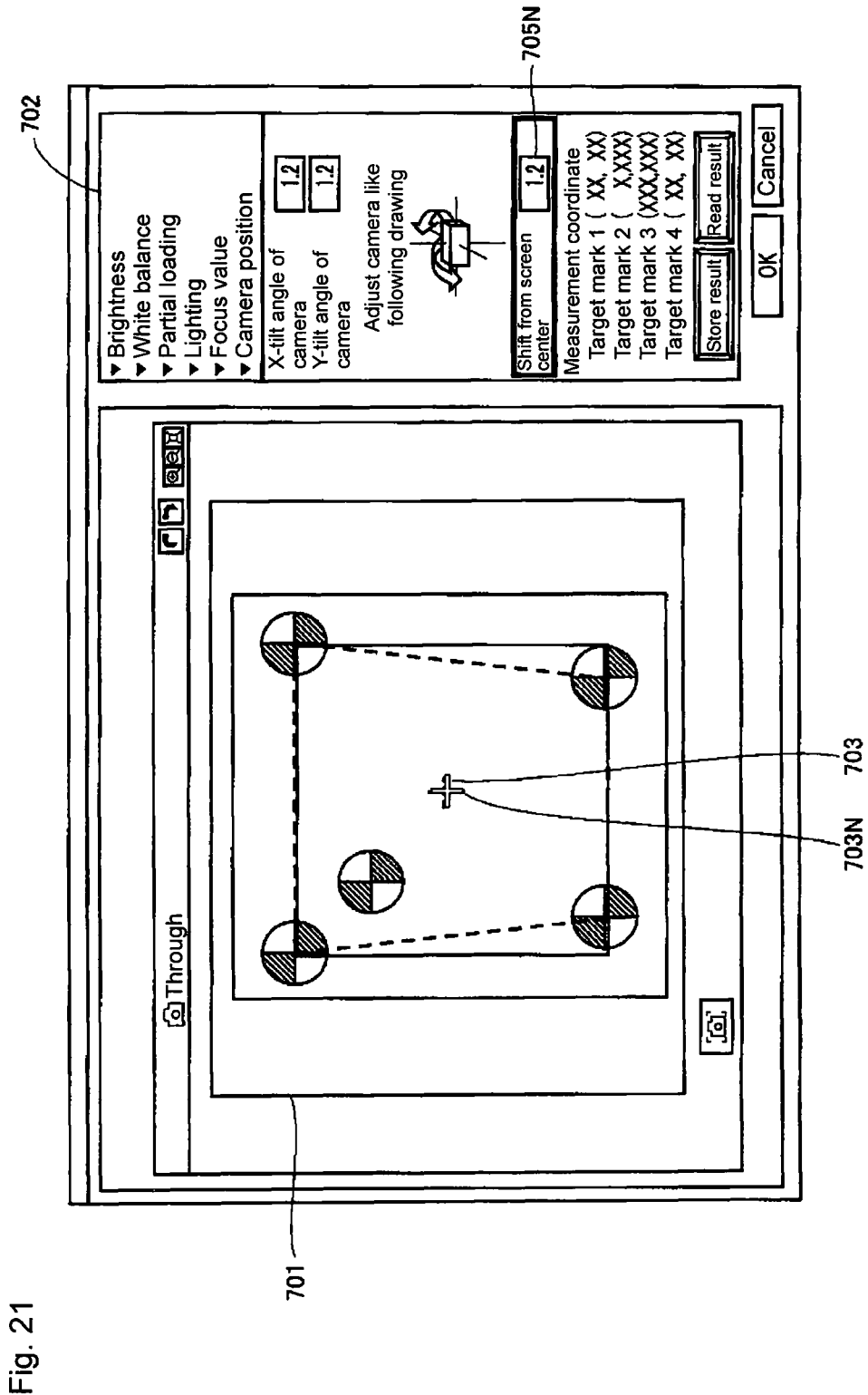
FIG. 21 is a view of a screen example for illustrating measurement processing according to the second embodiment.

The operator performs the operation to provide the instruction to match the gravity centers with each other through the operation unit 70 when checking the image in FIG. 20 to determine that the display positions of the images 703 and 703N of the gravity centers are matched with each other. The operator performs the operation to provide the instruction not to match the gravity centers with each other when determining that the display positions of the images 703 and 703N of the gravity centers are not matched with each other (Step S4). When determining that the display positions of the images 703 and 703N of the gravity centers are not matched with each other, the operator moves the target sheet 700 such that the gravity centers are matched with each other. FIG. 21 illustrates a display example of the screen in Step S4. In FIG. 21, the image processing unit 612 calculates the distance between the images 703 and 703N from the coordinates of the images 703 and 703N, and the distance is displayed as the data 705N.

When the CPU 61 receives the operation in the case of the mismatch (NO in Step S4), the processing goes to Step S3. Therefore, the image of the post-movement target sheet 700 is captured, and the measurement processing unit 611 performs the measurement processing to the image data acquired by the imaging (Step S3).

On the other hand, when the CPU 61 receives the operation in the case of the match (YES in Step S4), the tilt calculation unit 613 acquires the tilt angle using the measurement result in Step S3 and the data of the adjustment file 631. The image processing unit 612 displays the assist information for the posture adjustment based on the acquired tilt angle (Step S5). The acquisition of the tilt angle and the display mode of the information related thereto are identical to those of the first embodiment, and the description is not given.

The operator checks the output information. When determining that the tilt exists, the operator manually adjusts the posture of the visual sensor 100 while operating the operation unit 70.

When the CPU 61 determines that the operator performs the operation through the operation unit 70 (NO in Step S6a), the processing goes to Step S3. Therefore, the visual sensor 100 performs the imaging action after the posture adjustment performed by the operator. The pieces of processing from Step S3 are similarly performed to the image data acquired by the imaging.

On the other hand, when determining that the tilt does not exist, the operator does not operate the operation unit 70. Accordingly, the CPU 61 determines that the operator does not operate the operation unit 70 (YES in Step S6a), and the processing goes to Step S6b.

Whether the operation to provide the storage instruction is performed through the operation unit 70 is determined in Step S6b. When the CPU 61 determines that the operation to provide the storage instruction is performed (YES in Step S6b), the storage unit 615 stores the information on the currently-displayed image data and the information on the measurement result in the adjustment file 631 of the RAM 63, while correlating the information on the currently-displayed image data and the information on the measurement result with each other (Step S6c). When the CPU 61 determines that the operation of the storage instruction is not performed (NO in Step S6b), the storage unit 615 does not perform the storage processing, and the sequence of the pieces of processing is ended <Direction for Posture Adjustment>

Figure 22:
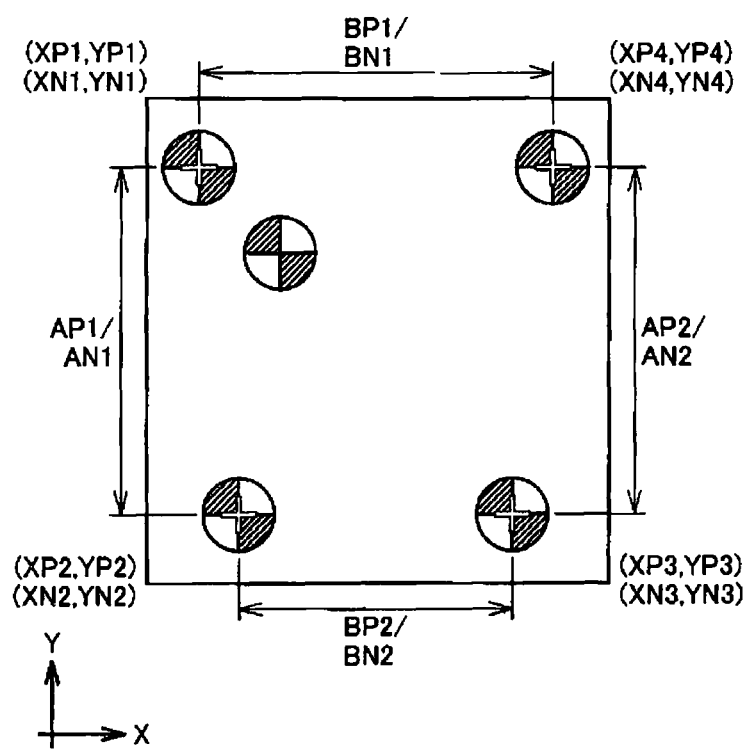
FIG. 22 is a view illustrating a procedure to determine a direction for a posture adjustment according to the second embodiment.
Figure 23:
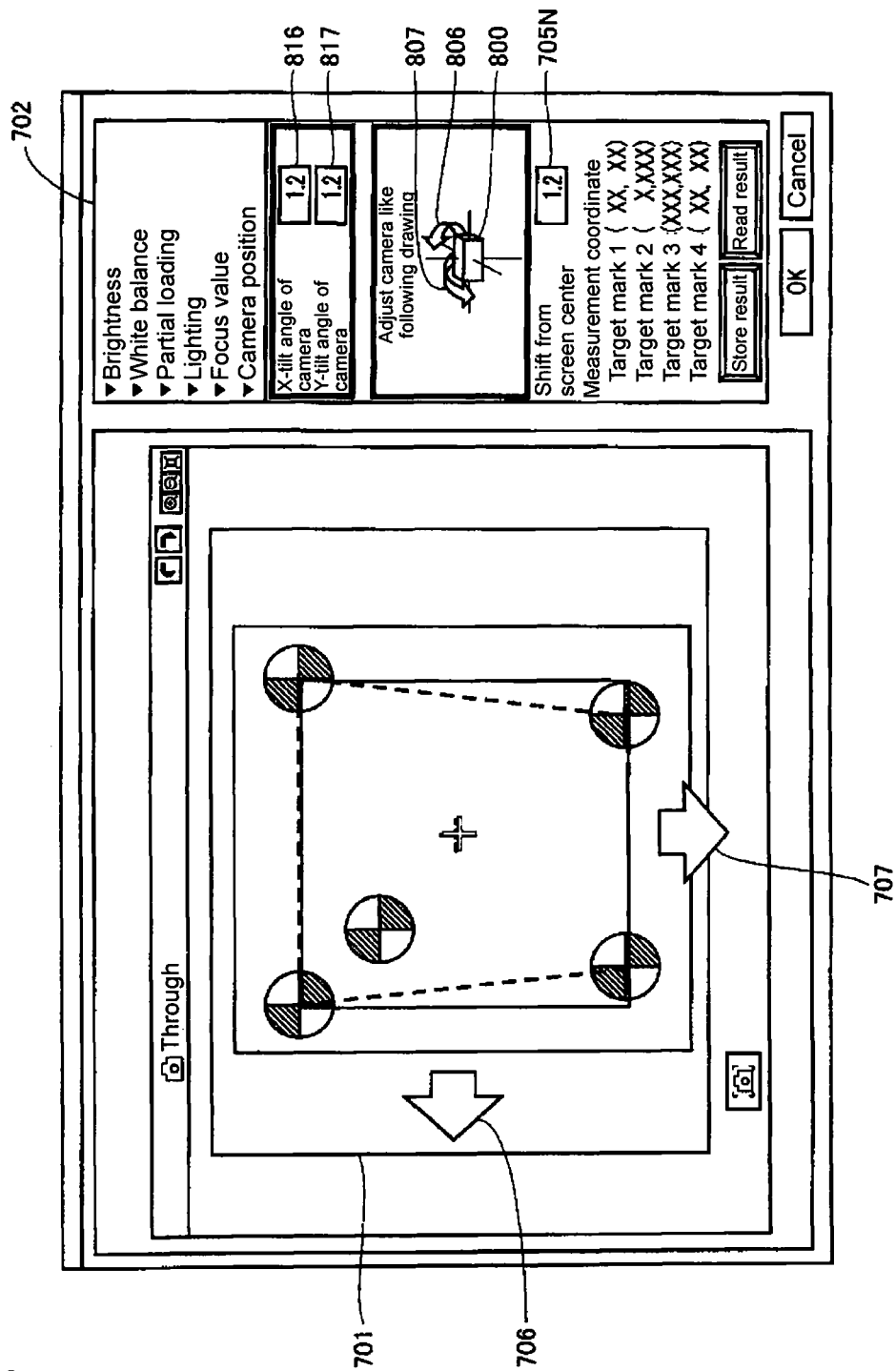
FIG. 23 is a view illustrating a screen on which the direction is displayed in order to adjust the posture according to the second embodiment.

The acquisition of the tilt angle and the presentation of the assist information for the posture adjustment in Step S5 of FIG. 18 will be described below. FIG. 22 is a view illustrating a procedure to determine a direction for the posture adjustment according to the second embodiment of the invention. FIG. 23 is a view illustrating a screen on which the direction is displayed in order to adjust the posture according to the second embodiment of the invention.

The tilt angle calculation procedure performed by the tilt calculation unit 613 will be described with reference to FIG. 22. The tilt calculation unit 613 calculates the tilt angles in the X-direction and the Y-direction with respect to the conveying path surface of the imaging visual field surface. The tilt angles are based on the coordinate values ((XN1, YN1), (XN2, YN2), (XN3, YN3), and (XN4, YN4)) of the four marks acquired by the measurement processing of the captured image data and the coordinate values ((XP1, YP1), (XP2, YP2), (XP3, YP3), and (XP4, YP4)) of the four marks read from the adjustment file 631 in Step S2c.

AP1, AP2, AN1 and AN2 are calculated as: AP1=|YP1−YP2|, AP2=|YP4−YP3|, AN1=|YN1−YN2|, and AN2=|YN4−YN3|. When the determination that a condition of (AP1/AP2)>(AN1/AN2) holds is made with respect to the tilt angle in the X-direction, the image processing unit 612 displays the right-pointing arrow on the screen. When the determination that a condition of (AP1/AP2)<(AN1/AN2) holds is made, the image processing unit 612 displays the left-pointing arrow 706 on the screen (see FIG. 23).

BP1, BP2, BN1 and BN2 are calculated as: BP1=|XP1−XP4|, BP2=|XP2−XP3|, BN1=|XN1−XN4|, and BN2=|XN2−XN3|. When the determination that a condition of (BP1/BP2)>(BN1/BN2) holds is made with respect to the tilt in the Y-direction, the image processing unit 612 displays the downward arrow 707 on the screen (see FIG. 23). When the determination that a condition of (BP1/BP2)<(BN1/BN2) holds is made, the image processing unit 612 displays the upward arrow on the screen. These arrows are displayed in association with the image of the region 701.

Referring to FIG. 23, for the image 800 expressing the visual sensor 100, the image processing unit 612 also displays corresponding arrows 806 and 807 in conjunction with the display of the arrows 706 and 707, and presents the direction in which the posture of the visual sensor 100 is adjusted.

Alternatively, in order to quantitatively express the tilt angle, the image processing unit 612 may calculate pieces of data 816 and 817 of the tilt angles of the visual sensor 100 and display the pieces of data 816 and 817 together with, or independently of, the data 705N. The data 816 is calculated by (AN1/AN2), and the data 817 is calculated by (BN1/BN2).

The operator adjusts the posture of the visual sensor 100 by referring to the assist information including the tilt angle. At this point, the image processing unit 612 may display the square, which is formed by connecting the centers of the four marks of the target sheet 700 when the imaging visual field surface and the conveying path surface are parallel to each other, as the target of the posture adjustment.

Figure 24A:
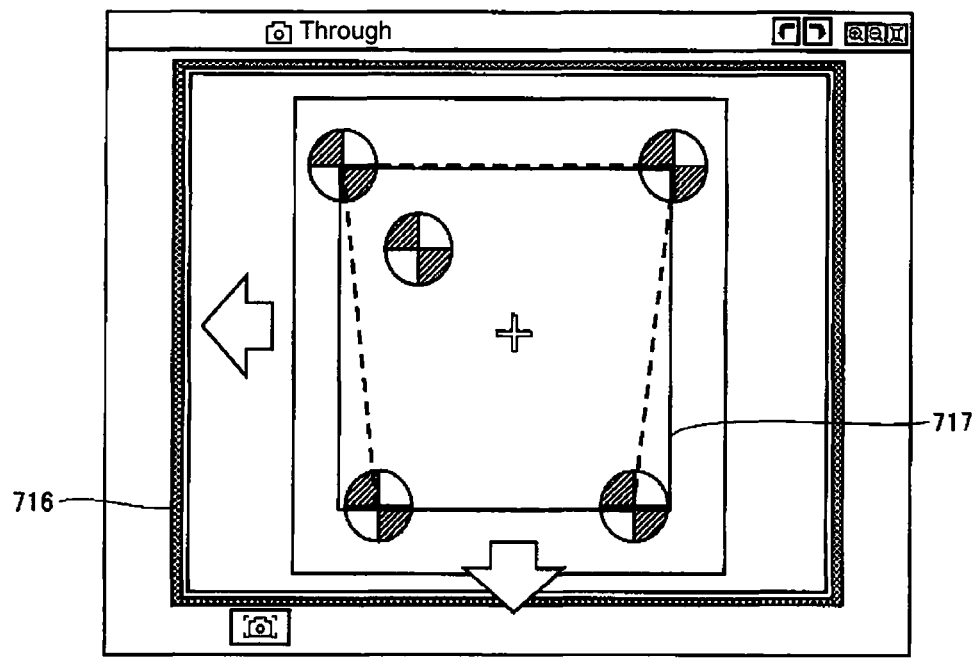
FIGS. 24A and 24B are views illustrating a display screen during the posture adjustment according to the second embodiment.
Figure 24B:
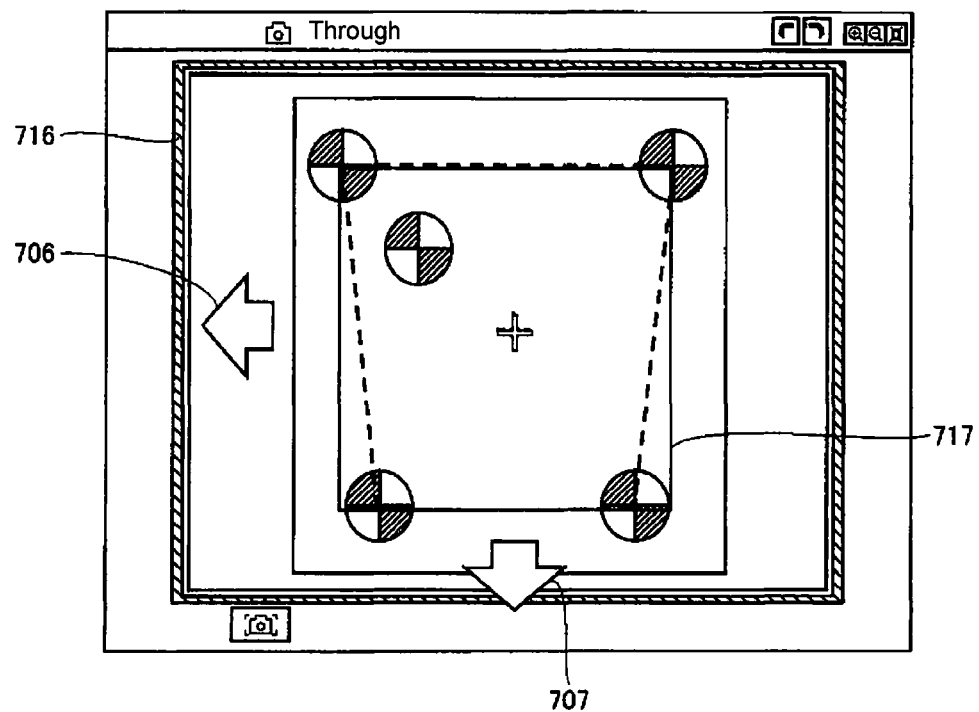

As a result of the posture adjustment, the determination that the posture of the visual sensor 100 either falls-into or does-not-fall-into the range where the predetermined accuracy (for example, the accuracy of the measurement processing of the conveyed workpiece) can be guaranteed is made, and the information indicating the determination is outputted. For example, the image processing unit 612 calculates the values of (AN1/AN2) and (BN1/BN2) after the posture adjustment, and determines whether the calculated value falls into the predetermined range. For example, the image 716 is displayed as the information indicating the determination result (see FIGS. 24A and 24B). When the calculated value falls into the predetermined range, for example, the frame image 716 surrounding the region 701 is displayed in green as illustrated in FIG. 24A. When the calculated value does not fall into the predetermined range, for example, the image 716 is displayed in red (see FIG. 24B). Therefore, the indication of the completion of the posture adjustment can be presented.

When the calculated value falls into the predetermined range, the arrow indicating the adjustment direction may be deleted from the image in FIG. 24A. The information presented as the indication is not limited to the frame image 716, and the distinction of the display mode of the image 716 is not limited to the method in which the color is used.

In the embodiments, the tilt angle (or the degree of deformation of the shape) is acquired using the coordinate of the center position of each mark calculated by the center calculation unit 614. However, the acquisition method is not limited to that of the embodiments. For example, the degree of deformation of the mark shape (for example, an ellipse) in the captured image from the precise circle is acquired when the each of the four marks is formed by a precise circle. Therefore, the tilt angle may be acquired as the degree of deformation The support device 600 (or the operation display device 500) has various functions in FIG. 3. Alternatively, the captured image processing unit 120 may have the functions in FIG. 3. In this case, the adjustment file 631 is stored in the memory 124, and the monitor 67 of the support device 600 or a display (not illustrated) of the operation display device 500 is mainly used as an output destination of the assist information for the posture adjustment of the visual sensor 100.

It is noted that the disclosed embodiments are illustrative and not restricted. The scope of the invention is defined by not the above description but the claims, and the meanings equivalent to the claims and all the changes within the claims are included in the invention.

Description Of Symbols
- 70 operation unit
- 100 visual sensor
- 110 imaging unit
- 120 captured image processing unit
- 124 memory
- 126 imaging control unit
- 500 operation display device
- 600 support device
- 611 measurement processing unit
- 612 image processing unit
- 613 tilt calculation unit
- 614 center calculation unit
- 615 storage unit
- 631 adjustment file
- 700 target sheet
- 701, 702 region

The invention claimed is:

1. An image processing device comprising:
a memory storing a computer program; and
a processor coupled to the memory configured by the computer program with instructions to perform operations comprising:
an image reception operation for receiving an image of a target workpiece on a surface of a conveying path captured by an imaging unit, the imaging unit being disposed to image at least part of the conveying path in an imaging visual field;
a position acquisition operation for acquiring a position of the target workpiece in the captured image received during the image reception operation;
a tilt acquisition operation for acquiring a tilt angle of a surface including the imaging visual field of the imaging unit with respect to the surface of the conveying path using the acquired position of the target workpiece in the captured image; and
an output operation for outputting assist information for assisting a posture adjustment of the imaging unit using the acquired tilt angle, the tilt angle comprising a deviation of the surface including the imaging visual field and the surface of the conveying path from a condition in which the surface including the imaging visual field and the surface of the conveying path are parallel to each other wherein
the processor is configured to perform operations such that:
the image reception operation performs operations to acquire coordinate positions of four marks on a target sheet placed on the surface of the conveying path; and
the tilt acquisition operation performs operations to acquire the tilt angle of the surface of the imaging field with respect to the surface of the conveying path from the coordinate positions of the four marks, and
a shape formed by a line connecting the four marks is a trapezoid when the imaging visual field surface and the conveying surface are in a condition in which the surface including the imaging visual field and the surface of the conveying path are parallel to each other.

2. The image processing device according to claim 1, wherein the assist information includes information indicating a direction in which a posture of the imaging unit is to be changed.

3. The image processing device according to claim 1, wherein the processor is configured to perform operations such that the tilt acquisition operation acquires the tilt angle as a deviation amount between the acquired position of the target workpiece in the captured image and a predetermined position in the captured image.

4. The image processing device according to claim 1, wherein the processor is configured to perform operations such that the tilt acquisition operation acquires the tilt angle as a distance between the acquired position of the target workpiece in the captured image and a predetermined position in the captured image.

5. The image processing device according to claim 1, wherein the target workpiece has a predetermined shape, and
the processor is configured to perform operations such that the tilt acquisition operation acquires the tilt angle as a degree of deformation of a shape of the target workpiece in the captured image from the predetermined shape.

6. The image processing device according to claim 1, wherein the assist information includes the captured image, and
the processor is configured to perform operations such that the output operation stores the assist information in the memory.

7. The image processing device according to claim 6, wherein the processor is configured to perform operations such that the tilt acquisition operation acquires the tilt angle as a deviation amount between the position of the target workpiece in the captured image included in the stored assist information stored in the memory and the position of the target workpiece, acquired by the position acquisition operation, in the captured image received by the image reception operation.

8. The image processing device according to claim 6, wherein the processor is configured to perform operations such that the tilt acquisition operation acquires the tilt angle as a distance between the position of the target workpiece in the captured image included in the assist information stored in the memory and the position of the target workpiece, acquired by the position acquisition operation, in the captured image received by the image reception operation.

9. The image processing device according to claim 6, wherein the target workpiece has a predetermined shape, and the processor is configured to perform operations such that the tilt acquisition operation acquires the tilt angle as a degree of deformation of the shape of the target workpiece in the captured image received from the imaging unit by the image reception part from the shape of the target workpiece in the captured image included in the assist information stored in the memory.

10. A non-transitory computer readable medium storing a computer program that, when executing on a computer, causes the computer to perform operations for image processing, the operations comprising:

receiving an image of a target workpiece on a surface of a conveying path with an imaging unit, the imaging unit being disposed to image at least part of the conveying path in an imaging visual field;

acquiring a position of the target workpiece in the captured image received by the image reception part;

acquiring a tilt angle of a surface including the imaging visual field of the imaging unit with respect to the surface of the conveying path using the acquired position of the target workpiece in the captured image;

acquiring coordinate positions of four marks on respective corners of a target sheet placed on the surface of the conveying path;

acquiring the tilt angle of the surface including the imaging field with respect to the surface of the conveying path from the coordinate positions of the four marks; and outputting assist information for assisting a posture adjustment of the imaging unit using the acquired tilt angle, the tilt angle comprising a deviation of the surface including the imaging visual field and the surface of the conveying path from a condition in which the surface including the imaging visual field and the surface of the conveying path are parallel to each other, wherein a shape formed by a line connecting the four marks is a trapezoid when the imaging visual field surface and the conveying surface are in a condition in which the surface including the imaging visual field and the surface of the conveying path are parallel to each other.

* * * * *